US011603467B2

(12) United States Patent
Soma

(10) Patent No.: US 11,603,467 B2
(45) Date of Patent: Mar. 14, 2023

(54) POLYCARBONATE RESIN COMPOSITION

(71) Applicant: Mitsubishi Engineering-Plastics Corporation, Minato-ku (JP)

(72) Inventor: Minoru Soma, Hiratsuka (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 452 days.

(21) Appl. No.: 16/325,077

(22) PCT Filed: Aug. 30, 2017

(86) PCT No.: PCT/JP2017/031138
§ 371 (c)(1),
(2) Date: Feb. 12, 2019

(87) PCT Pub. No.: WO2018/047693
PCT Pub. Date: Mar. 15, 2018

(65) Prior Publication Data
US 2020/0291226 A1  Sep. 17, 2020

(30) Foreign Application Priority Data

Sep. 9, 2016 (JP) ............................. JP2016-176746
May 10, 2017 (JP) ............................. JP2017-093845

(51) Int. Cl.
*C08L 69/00* (2006.01)
*C08L 51/08* (2006.01)
*C08K 3/34* (2006.01)
*C08K 5/523* (2006.01)
*B61D 17/00* (2006.01)
*B61D 33/00* (2006.01)
*B61D 37/00* (2006.01)
*C08K 5/5399* (2006.01)

(52) U.S. Cl.
CPC ............. *C08L 69/00* (2013.01); *B61D 17/00* (2013.01); *B61D 33/0007* (2013.01); *B61D 37/00* (2013.01); *B61D 37/003* (2013.01); *C08K 3/34* (2013.01); *C08K 5/523* (2013.01); *C08L 51/085* (2013.01); *C08K 5/5399* (2013.01); *C08L 2201/02* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 5,463,013 A * | 10/1995 | Tokuda | ................. | C07C 69/708 524/601 |
| 5,723,526 A * | 3/1998 | Nagasawa | ................ | C08L 69/00 524/451 |
| 6,127,465 A * | 10/2000 | Nodera | .................. | C08K 5/523 514/127 |
| 6,150,443 A * | 11/2000 | Nodera | .................. | C08K 5/42 524/115 |
| 7,446,144 B2 | 11/2008 | Wenz et al. | | |
| 8,748,521 B2 | 6/2014 | Taschner et al. | | |
| 2007/0021539 A1 * | 1/2007 | Shibuya | ................. | C08L 69/00 524/156 |
| 2007/0225441 A1 * | 9/2007 | Wenz et al. | ............ | C08G 64/06 524/115 |
| 2009/0215934 A1 * | 8/2009 | Nakamura | .............. | C08L 69/00 524/451 |
| 2010/0160508 A1 | 6/2010 | Taschner et al. | | |
| 2012/0129990 A1 | 5/2012 | Kikuchi et al. | | |
| 2013/0030094 A1 * | 1/2013 | Uchimura | .............. | C08K 5/521 429/176 |

(Continued)

FOREIGN PATENT DOCUMENTS

| | | | |
|---|---|---|---|
| JP | 07228764 | * | 8/1995 |
| JP | 5128480 B2 | | 1/2013 |

(Continued)

OTHER PUBLICATIONS

Bergman, A Novel Abbreviation Standard of Organobromine, Organochlorine and Organophosphorous Flame Retardants . . . ; Environmental International 49 (2012) pp. 57-82. (Year: 2012).*

(Continued)

*Primary Examiner* — David J Buttner

(74) *Attorney, Agent, or Firm* — Oblon, McClelland, Maier & Neustadt, L.L.P.

(57) ABSTRACT

A polycarbonate resin composition comprising, 100 mass parts of (A1) a polycarbonate resin that contains a polycarbonate resin having a structural unit of the following general formula (1) and (A2) a polycarbonate resin having a structural unit of the general formula (2) in a mass ratio (A1)/(A2) of 100/0 to 10/90; 3 to 20 mass parts of a phosphorus flame retardant (B); 2 to 20 mass parts of a silicone flame retardant (C); and 3 to 100 mass parts of an inorganic filler (D), wherein the phosphorus flame retardant (B) is a phosphazene compound and/or a condensed phosphate ester, [C1]

(1)

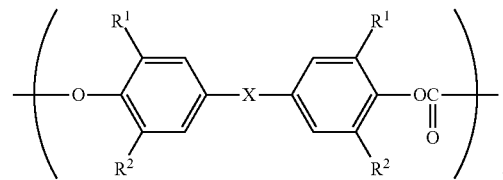

13 Claims, No Drawings

(56) References Cited

U.S. PATENT DOCUMENTS

2014/0303296 A1\* 10/2014 Inazawa .................. C08L 69/00
                                                          524/127
2014/0353544 A1   12/2014 Guo et al.
2015/0086856 A1    3/2015 Tomita et al.
2018/0155544 A1\*  6/2018 Lee ........................ C08L 69/00

FOREIGN PATENT DOCUMENTS

| JP | 2013-64047 A | | 4/2013 |
|----|---|---|---|
| JP | 2013-71958 A | | 4/2013 |
| JP | 2013064047 | \* | 4/2013 |
| JP | 2013-237798 A | | 11/2013 |
| JP | 2013-256553 A | | 12/2013 |
| JP | 2014-240492 A | | 12/2014 |
| JP | 2016-23290 A | | 2/2016 |
| JP | 5882062 B2 | | 3/2016 |
| WO | WO 2016/103161 A1 | | 6/2016 |

OTHER PUBLICATIONS

Korean Application 10-2016-0164424 filing date Dec. 5, 2016 (no publication date). (Year: 0000).\*

International Search Report dated Nov. 21, 2017, in PCT/JP2017/031138 filed on Aug. 30, 2017.

Office Action dated Dec. 22, 2020 in corresponding Chinese Patent Application No. 201780055498.3 (English Translation only), 9 pages.

\* cited by examiner

POLYCARBONATE RESIN COMPOSITION

TECHNICAL FIELD

The present invention relates to a polycarbonate resin composition and more particularly relates to a polycarbonate resin composition that achieves an excellent low heat release performance and an excellent low smoke generation performance.

BACKGROUND ART

Resin materials have in recent years begun to be used for various interior members for the vehicles typical of, for example, railways, and polycarbonate resins have already entered into use for interior members in, e.g., railway vehicles and aircraft.

Application as a railway vehicle material requires compliance with the flame retardancy standards for railway vehicles set by the particular country or a particular governmental agency. Moreover, more rigorous fire protection standards than in the past have come to be required of vehicle materials based on considerations of enhancing safety. In particular, the newly issued EN 45545-2 European Railway Standard for Fire Safety, and the like require that an excellent low heat release performance and an excellent low smoke generation performance be satisfied during combustion.

Various proposals have already been made in order to enhance the flame retardancy of polycarbonate resins. For example, PTL 1 discloses a resin composition that contains a polycarbonate resin having a branched structure, a graft polymer, a phosphorus flame retardant, talc, and so forth. PTL 2 and PTL 3 disclose polycarbonate resin compositions that contain a silicone acrylate rubber, talc, and a phosphorus flame retardant.

However, these polycarbonate resin compositions are unable to comply with the aforementioned standard, which requires higher fire protection standards.

CITATION LIST

Patent Literature

[PTL 1] Japanese Patent No. 5128480
[PTL 2] Japanese Patent No. 5882062
[PTL 3] JP 2014-240492 A

SUMMARY OF INVENTION

Technical Problem

An object of (problem to be addressed by) the present invention is to provide a polycarbonate resin composition that achieves an excellent low heat release performance and an excellent low smoke generation performance.

Solution to Problem

As a result of extensive and intensive investigations directed to solving the indicated problem, the present inventor discovered that by adding the combination of a phosphorus flame retardant and a silicone flame retardant to a polycarbonate resin having a prescribed structure and additionally incorporating an inorganic filler—an excellent char formation is promoted during combustion, an excellent low heat release performance and an excellent smoke generation performance can be expressed, and the high fire protection standards as described above can be achieved. The present invention was achieved based on this discovery.

The polycarbonate resin composition according to the first invention of the present invention characteristically contains 100 mass parts of a polycarbonate resin that contains a polycarbonate resin (A1) having a structural unit with the following general formula (1) and a polycarbonate resin (A2) having a structural unit with the following general formula (2), in a proportion of 100/0 to 10/90 for the (A1)/(A2) mass ratio; 3 to 20 mass parts of a phosphorus flame retardant (B); 2 to 20 mass parts of a silicone flame retardant (C); and 3 to 100 mass parts of an inorganic filler (D), wherein the phosphorus flame retardant (B) is a phosphazene compound and/or a condensed phosphate ester.

[C1]

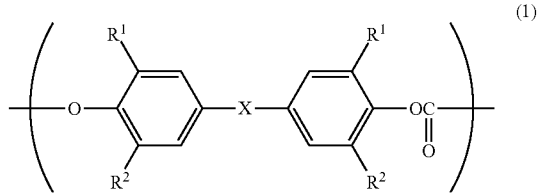

In general formula (1), $R^1$ represents a methyl group; $R^2$ represents a hydrogen atom or a methyl group; X represents

[C2]

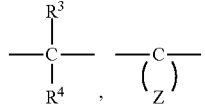

wherein, $R^3$ and $R^4$ represent a hydrogen atom or a methyl group; and Z represents a group that by bonding to the carbon atom C forms a possibly substituted alicyclic hydrocarbon having 6 to 12 carbons.

[C3]

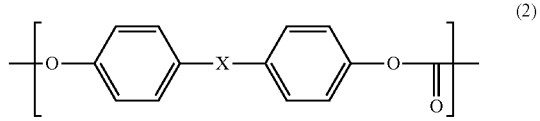

(X in general formula (2) is defined as for general formula (1).)

The polycarbonate resin composition according to the second invention of the present invention characteristically contains 100 mass parts of a polycarbonate resin containing a polycarbonate resin (A1) having a structural unit with general formula (1) as given above and a polycarbonate resin (A2) having a structural unit with general formula (2) as given above, in a proportion of (less than 10)/(more than 90) to 0/100 for the (A1)/(A2) mass ratio; 3 to 40 mass parts of a phosphorus flame retardant (B); 2 to 40 mass parts of a silicone flame retardant (C); and 15 to 100 mass parts of an inorganic filler (D), wherein the phosphorus flame retardant (B) is a condensed phosphate ester, and does not contain a phosphazene compound or contains a phosphazene compound in a content of less than 3 mass parts.

Advantageous Effects of Invention

The first invention of the present invention can thus provide a polycarbonate resin composition that achieves an excellent low heat release performance and an excellent low smoke generation performance, and that accrues the effect of enabling advantageous use in particular as a material for railway vehicle interiors.

The second invention of the present invention can thus also provide a polycarbonate resin composition that achieves an excellent low heat release performance and an excellent low smoke generation performance, and that accrues the effect of enabling advantageous use in particular as a material for railway vehicle interiors.

DESCRIPTION OF EMBODIMENTS

<First Invention>

The first invention of the present invention will be described in detail in the following first.

In this Description, the constituent requirements of the present invention are described based on specific examples and representative embodiments of the present invention; however, this should not be construed as a limitation of the present invention to or by these specific examples and embodiments.

Unless specifically indicated otherwise, in this Description "to" in the specification of a numerical value range is used in the sense of including the numerical values before and after the "to" that are used as the lower limit and upper limit.

The polycarbonate resin composition according to the first invention characteristically contains 100 mass parts of a polycarbonate resin that contains a polycarbonate resin (A1) having a structural unit with the preceding general formula (1) and a polycarbonate resin (A2) having a structural unit with the preceding general formula (2), in a proportion of 100/0 to 10/90 for the (A1)/(A2) mass ratio; 3 to 20 mass parts of a phosphorus flame retardant (B); 2 to 20 mass parts of a silicone flame retardant (C); and 3 to 100 mass parts of an inorganic filler (D), wherein the phosphorus flame retardant (B) is a phosphazene compound and/or a condensed phosphate ester.

[Polycarbonate Resin (A1)]

Polycarbonate resin (A1), which is used in the polycarbonate resin composition of the first invention, is a polycarbonate resin that has the structural unit represented by the following general formula (1).

[C4]

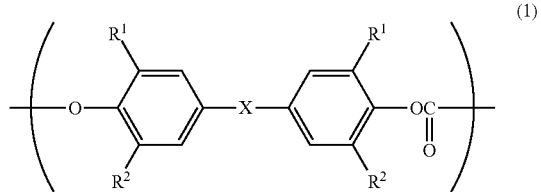

(1)

(In general formula (1), $R^1$ represents a methyl group; $R^2$ represents a hydrogen atom or a methyl group; X represents

[C5]

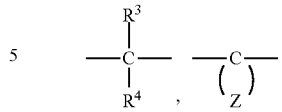

($R^3$ and $R^4$ represent a hydrogen atom or a methyl group; and Z represents a group that by bonding to C forms a possibly substituted alicyclic hydrocarbon having 6 to 12 carbons.)

With reference to general formula (1), $R^1$ is a methyl group; $R^2$ is a hydrogen atom or a methyl group; and in particular $R^2$ is preferably a hydrogen atom.

When X is

[C6]

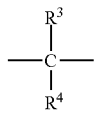

it is preferably an isopropylidene group, in which $R^3$ and $R^4$ are both methyl groups. When X is

[C7]

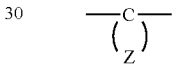

Z, by bonding to the carbon C that is bonded to the two phenyl groups in general formula (1), forms a divalent alicyclic hydrocarbon group having 6 to 12 carbons, wherein this divalent alicyclic hydrocarbon group can be exemplified by cycloalkylidene groups such as a cyclohexylidene group, a cycloheptylidene group, a cyclododecylidene group, an adamantylidene group, and a cyclododecylidene group. The substituted forms can be exemplified by these groups bearing a methyl substituent or an ethyl substituent. Among the preceding, a cyclohexylidene group, a methyl-substituted cyclohexylidene group (preferably a 3,3,5-trimethyl-substituted form), and a cyclododecylidene group are preferred.

The following polycarbonate resins i) to iv) are preferred specific examples of the polycarbonate resin (A1) in the first invention:

i) polycarbonate resin (A1) having the 2,2-bis(3-methyl-4-hydroxyphenyl)propane structural unit, i.e., having a structural unit in which $R^1$ is a methyl group, $R^2$ is a hydrogen atom, and X (or —$CR^3R^4$—) is an isopropylidene group;

ii) polycarbonate resin (A1) having the 2,2-bis(3,5-dimethyl-4-hydroxyphenyl) propane structural unit, i.e., having a structural unit in which $R^1$ is a methyl group, $R^2$ is a methyl group, and X is an isopropylidene group;

iii) polycarbonate resin (A1) having the 2,2-bis(3-methyl-4-hydroxyphenyl)cyclohexane structural unit, i.e., having a structural unit in which $R^1$ is a methyl group, $R^2$ is a hydrogen atom, and X (or —C(=Z)—) is a cyclohexylidene group; and iv) polycarbonate resin (A1) having the 2,2-bis(3-methyl-4-hydroxyphenyl)cyclodecane structural unit, i.e., having a structural unit in which $R^1$ is a methyl group, $R^2$ is a hydrogen atom, and X (or —C(=Z)—) is a cyclododecylidene group.

Among the preceding, polycarbonate resins i), ii), and iii) are more preferred; polycarbonate resins i) and iii) are still more preferred; and polycarbonate resin i) is particularly preferred.

These polycarbonate resins (A1) can be produced using the following, respectively, as the dihydroxy compound: 2,2-bis(3-methyl-4-hydroxyphenyl)propane, 2,2-bis(3,5-dimethyl-4-hydroxyphenyl)propane, 2,2-bis(3-methyl-4-hydroxyphenyl)cyclohexane, and 2,2-bis(3-methyl-4-hydroxyphenyl)cyclododecane.

The polycarbonate resin (A1) may also have carbonate structural units other than the structural unit with general formula (1) and, for example, may have a structural unit with general formula (2) (i.e., a structural unit derived from bisphenol A) or may have a structural unit derived from another dihydroxy compound as described below. The amount of copolymerization of structural units other than the general formula (1) structural unit is generally not more than 60 mol % and is preferably not more than 55 mol % or not more than 50 mol %, more preferably not more than 40 mol %, still more preferably not more than 30 mol %, particularly preferably not more than 20 mol % or not more than 10 mol %, and most preferably among the preceding not more than 5 mol %.

The polycarbonate resin (A1) and polycarbonate resin (A2) in the first invention are different resins, and even when the polycarbonate resin (A1) contains a bisphenol A-derived unit as a copolymerized unit, it is to be regarded as a polycarbonate resin (A1) as long as it has a structural unit represented by general formula (1). When the polycarbonate resin (A1) contains a bisphenol A-derived carbonate structural unit as a copolymerized unit, the bisphenol A-derived component in the polycarbonate resin (A1) is preferably less than 50 mol % and is more preferably not more than 30 mol %, still more preferably not more than 20 mol %, even more preferably not more than 10 mol %, and particularly preferably not more than 5 mol %.

The viscosity-average molecular weight (Mv) of the polycarbonate resin (A1) used in the first invention is not limited, but will generally be 10,000 to 90,000. A good moldability accrues and a molded article having a high mechanical strength is obtained when the viscosity-average molecular weight is in the indicated range. At below 10,000, the impact resistance undergoes a substantial decline and there is high potential for the production of defects, e.g., cracking and chipping, during conversion into a product. The fluidity declines at above 90,000. The preferred lower limit for the viscosity-average molecular weight of the polycarbonate resin (A1) is 11,000, with 12,000 being more preferred and 15,000 being still more preferred. The preferred upper limit is 70,000, with 40,000 being more preferred, 35,000 being still more preferred, and 31,000 being particularly preferred.

In this Description, the viscosity-average molecular weight (Mv) of the polycarbonate resin is the value provided by measurement of the intrinsic viscosity [η] of the polycarbonate resin (sample) in methylene chloride at 20° C. using a Ubbelohde viscometer and calculation using the following formulas.

$$\eta_{sp}/C = [\eta] \times (1 + 0.28 \eta_{sp})$$

$$[\eta] = 1.23 \times 10^{-4} \times (Mv)^{0.83}$$

In the formulas, $\eta_{sp}$ is the specific viscosity measured at 20° C. on a methylene chloride solution of the polycarbonate resin, and C is the concentration of this methylene chloride solution. A methylene chloride solution with a polycarbonate resin concentration of 0.6 g/dl is used.

A single species or a mixture of two or more species may be used for the polycarbonate resin (A1), and the viscosity-average molecular weight may be adjusted by mixing two or more species of polycarbonate resins having different viscosity-average molecular weights. In addition, as necessary, a polycarbonate resin having a viscosity-average molecular weight outside the preferred range indicated above may be admixed and used.

[Polycarbonate Resin (A2)]

Polycarbonate resin (A2), which is used in the polycarbonate resin composition of the first invention, is a polycarbonate resin that has the structural unit represented by the following general formula (2).

[C8]

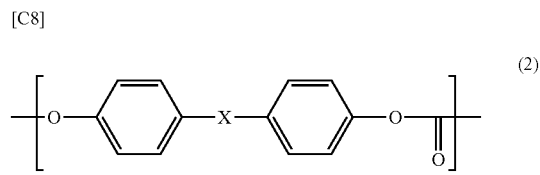

(X in general formula (2) is defined as for general formula (1).)

A preferred specific example of the polycarbonate structural unit represented by general formula (2) is 2,2-bis(4-hydroxyphenyl)propane, i.e., a bisphenol A-derived carbonate structural unit.

The polycarbonate resin (A2) may also have a carbonate structural unit other than the structural unit with general formula (2) and may have a carbonate structural unit derived from another dihydroxy compound. The copolymerization amount of structural units other than the structural unit with general formula (2) is generally preferably less than 50 mol %, more preferably not more than 40 mol %, still more preferably not more than 30 mol %, particularly preferably not more than 20 mol % or not more than 10 mol %, and most preferably not more than 5 mol %.

The other dihydroxy compound can be exemplified by the following aromatic dihydroxy compounds:

bis(4-hydroxyphenyl)methane, 2,2-bis(4-hydroxyphenyl)butane, 2,2-bis(4-hydroxyphenyl)pentane, 2,2-bis(4-hydroxyphenyl)-4-methylpentane, 1,1-bis(4-hydroxyphenyl)decane, 1,1-bis(4-hydroxyphenyl)cyclohexane, 1,1-bis(4-hydroxyphenyl)-1-phenylethane, bis(4-hydroxyphenyl)phenylmethane, 1,1-bis(4-hydroxyphenyl)cyclopentane, 9,9-bis(4-hydroxyphenyl)fluorene, 4,4'-dihydroxybenzophenone, 4,4'-dihydroxyphenyl ether, 4,4'-dihydroxybiphenyl, and 1,1-bis(4-hydroxyphenyl)-3,3,5-trimethylcyclohexane.

As described above, the polycarbonate resin (A2) is a different resin from the polycarbonate resin (A1), and a polycarbonate resin that contains a structural unit with general formula (1) as a copolymerized unit is treated as a polycarbonate resin (A1).

The viscosity-average molecular weight (Mv) of the polycarbonate resin (A2) is not limited, but will generally be 10,000 to 90,000. A good moldability accrues and a molded article having a high mechanical strength is obtained when the viscosity-average molecular weight is in the indicated range. At below 10,000, the impact resistance undergoes a substantial decline and there is high potential for the production of defects, e.g., cracking and chipping, during conversion into a product. The fluidity declines at above 90,000. The preferred lower limit for the viscosity-average molecular weight of the polycarbonate resin (A2) is 11,000, with 12,000 being more preferred and 15,000 being still more preferred. The preferred upper limit is 70,000, with 40,000 being more preferred, 35,000 being still more preferred, and 31,000 being particularly preferred.

The viscosity-average molecular weight (Mv) is defined as above.

The viscosity-average molecular weight of polycarbonate resin (A2) may be adjusted by mixing two or more polycarbonate resins having different viscosity-average molecular weights.

[Methods for Producing Polycarbonate Resins (A1) and (A2)]

There are no particular limitations on the method for producing the polycarbonate resins (A1) and (A2) used in the first invention, and any method may be used. Examples here are the interfacial polymerization method, melt transesterification method, pyridine method, ring-opening polymerization of cyclic carbonate compounds, and solid-state transesterification of a prepolymer.

Particularly advantageous methods among the preceding are specifically described in the following.

Interfacial Polymerization Method

The production of polycarbonate resins (A1) and (A2) by the interfacial polymerization method will be described first.

In the interfacial polymerization method, a dihydroxy compound as described above and a carbonate precursor (preferably phosgene) are reacted in the presence of a reaction-inert organic solvent and an aqueous alkali solution generally while holding the pH at 9 or above, and the polycarbonate resin is obtained by subsequently carrying out an interfacial polymerization in the presence of a polymerization catalyst. As necessary, the reaction system may contain a molecular weight modifier (terminating agent) and may contain an oxidation inhibitor in order to inhibit oxidation of the dihydroxy compound.

The reaction-inert organic solvent can be exemplified by chlorinated hydrocarbons such as dichloromethane, 1,2-dichloroethane, chloroform, monochlorobenzene, and dichlorobenzene; and by aromatic hydrocarbons such as benzene, toluene, and xylene. A single organic solvent may be used or any combination of two or more organic solvents in any proportions may be used.

The alkali compound in the aqueous alkali solution can be exemplified by alkali metal compounds such as sodium hydroxide, potassium hydroxide, lithium hydroxide, and sodium bicarbonate and by alkaline-earth metal compounds, whereamong sodium hydroxide and potassium hydroxide are preferred. A single alkali compound may be used or any combination of two or more alkali compounds in any proportions may be used.

There are no limitations on the concentration of the alkali compound in the aqueous alkali solution, and generally 5 to 10 mass % is used in order to control the pH in the aqueous alkali solution during the reaction to 10 to 12. In addition, for example, in order to control the pH of the aqueous phase to 10 to 12 and preferably 10 to 11 during phosgene injection, the molar ratio between the bisphenol compound and the alkali compound is generally 1: at least 1.9 and preferably 1: at least 2.0 and is generally 1: not more than 3.2 and preferably 1: not more than 2.5.

The polymerization catalyst can be exemplified by aliphatic tertiary amines such as trimethylamine, triethylamine, tributylamine, tripropylamine, and trihexylamine; alicyclic tertiary amines such as N,N'-dimethylcyclohexylamine and N,N'-diethylcyclohexylamine; aromatic tertiary amines such as N,N'-dimethylaniline and N,N'-diethylaniline; quaternary ammonium salts such as trimethylbenzylammonium chloride, tetramethylammonium chloride, and triethylbenzylammonium chloride; pyridine; guanine; and guanidine salts. A single polymerization catalyst may be used or any combination of two or more polymerization catalysts in any proportions may be used.

The molecular weight modifier can be exemplified by monohydric aromatic phenols that have a phenolic hydroxyl group; aliphatic alcohols such as methanol and butanol; mercaptan; and phthalimide, among which the aromatic phenols are preferred.

These aromatic phenols can be specifically exemplified by alkyl group-substituted phenols such as m-methylphenol, p-methylphenol, m-propylphenol, p-propylphenol, p-tert-butylphenol, and p-(long chain alkyl)-substituted phenol; vinyl group-containing phenols such as isopropenylphenol; epoxy group-containing phenols; and carboxyl group-containing phenols such as o-hydroxybenzoic acid and 2-methyl-6-hydroxyphenylacetic acid. A single molecular weight modifier may be used or any combination of two or more molecular weight modifiers in any proportions may be used.

The amount of use of the molecular weight modifier, expressed per 100 moles of the dihydroxy compound, is generally at least 0.5 moles and is preferably at least 1 mole and is generally not more than 50 moles and is preferably not more than 30 moles. The heat stability and hydrolysis resistance of the polycarbonate resin composition can be enhanced by having the amount of use of the molecular weight modifier be in the indicated range.

The mixing sequence for the reaction substrates, reaction medium, catalyst, additives, and so forth for the reaction may be freely selected as long as the desired polycarbonate resin is obtained, and the sequence may be freely established as appropriate. For example, when phosgene is used as the carbonate precursor, the molecular weight modifier may be admixed at any time from the reaction between the dihydroxy compound and the phosgene (phosgenation) up to and including the point at which the polymerization reaction is begun.

The reaction temperature is generally 0° C. to 40° C., and the reaction time is generally several minutes (for example, 10 minutes) to several hours (for example, 6 hours).

Melt Transesterification Method

The production of polycarbonate resins (A1) and (A2) by the melt transesterification method will now be described. For example, a transesterification reaction between a carbonate diester and a dihydroxy compound is carried out in the melt transesterification method.

The dihydroxy compound is as described above.

The carbonate diester, on the other hand, can be exemplified by dialkyl carbonate compounds such as dimethyl carbonate, diethyl carbonate, and di-tert-butyl carbonate; diphenyl carbonate; and substituted diphenyl carbonates such as ditolyl carbonate. Among these, diphenyl carbonate and substituted diphenyl carbonates are preferred and diphenyl carbonate is particularly preferred. A single carbonate diester may be used or any combination of two or more carbonate diesters in any proportions may be used.

Any ratio between the dihydroxy compound and carbonate diester may be used as long as the desired polycarbonate resin is obtained, but preferably the carbonate diester is used in at least an equimolar amount per 1 mole of the dihydroxy compound, while the use of at least 1.01 moles per 1 mole of the dihydroxy compound is more preferred. The upper limit is generally not more than 1.30 moles. Using this range makes it possible to adjust the amount of terminal hydroxyl group into a suitable range.

The amount of terminal hydroxyl group in a polycarbonate resin tends to exercise a major influence on, inter alia, the heat stability, hydrolysis stability, and color. Due to this, as necessary the amount of terminal hydroxyl group may be adjusted using any known method. With the transesterification reaction, a polycarbonate resin having an adjusted amount of terminal hydroxyl group can be obtained in general by adjustment or control of, for example, the mixing ratio between the carbonate diester and the dihydroxy compound and/or the depth of the vacuum during the transesterification reaction. The molecular weight of the obtained polycarbonate resin can also generally be adjusted by these processes.

The mixing ratio is as described above when the amount of terminal hydroxyl group is adjusted by adjusting the mixing ratio between the carbonate diester and the dihydroxy compound.

In addition, a separate admixture of a terminating agent may be carried out during the reaction in a more aggressive adjustment method. The terminating agent here can be exemplified by monohydric phenols, monobasic carboxylic acids, and carbonate diesters. A single terminating agent may be used or any combination of two or more terminating agents in any proportions may be used.

A transesterification catalyst is generally used in the production of polycarbonate resin by the melt transesterification method. Any transesterification catalyst can be used. Among transesterification catalysts, the use of alkali metal compounds and/or alkaline-earth metal compounds is preferred. In combination therewith, for example, a basic compound, e.g., a basic boron compound, basic phosphorus compound, basic ammonium compound, or an amine compound, may also be used on an auxiliary basis. A single transesterification catalyst may be used or any combination of two or more transesterification catalysts in any proportions may be used.

The reaction temperature in the melt transesterification method is generally 100° C. to 320° C. The pressure during the reaction is generally a vacuum of 2 mmHg or below. The specific process may be the execution of a melt polycondensation reaction under the indicated range of conditions while removing by-products, for example, a hydroxy compound.

The melt polycondensation reaction can be carried out by a batch method or a continuous method. In the case of the batch method, the mixing sequence for the reaction substrates, reaction medium, catalyst, additives, and so forth may be freely selected as long as the desired polycarbonate resin is obtained, and the sequence may be freely established as appropriate. The melt polycondensation reaction, however, is preferably carried out using a continuous regime based on a consideration of the stability of the polycarbonate resin and the polycarbonate resin composition.

A catalyst deactivator may also be used on an optional basis in the melt transesterification method. Any compound that can neutralize the transesterification catalyst can be used as the catalyst deactivator. Examples here are sulfur-containing acidic compounds and their derivatives. A single catalyst deactivator may be used or any combination of two or more catalyst deactivators in any proportions may be used.

The amount of use of the catalyst deactivator, expressed with reference to the alkali metal or alkaline-earth metal present in the transesterification catalyst, is generally at least 0.5 equivalents and preferably at least 1 equivalent and is generally not more than 10 equivalents and is preferably not more than 5 equivalents. In addition, with reference to the polycarbonate resin, it is generally at least 1 mass-ppm and generally not more than 100 mass-ppm and preferably not more than 20 mass-ppm.

The polycarbonate resins (A1) and (A2) preferably are a polycarbonate resin having a branched structure or contain a polycarbonate resin having a branched structure.

A branching agent may be used to introduce a branched structure into the polycarbonate resin, and, for example, a compound having three or more functional groups, e.g., 1,1,1-tris(4-hydroxyphenyl) ethane, $\alpha,\alpha',\alpha''$-tris(4-hydroxyphenyl)-1,3,5-triisopropylbenzene, 1-[$\alpha$-methyl-$\alpha$-(4'-hydroxyphenyl)ethyl]-4-[$\alpha',\alpha'$-(4''-hydroxyphenyl)ethyl]benzene, phloroglucin, trimellitic acid, and isatinbis(o-cresol), can be used.

As described in JP H08-259687 A and JP H08-245782 A, a polycarbonate resin having a branched structure can be produced, without adding a crosslinking agent, by a melt transesterification method that uses an aromatic dihydroxy compound and a carbonate diester.

The polycarbonate resins (A1) and (A2) preferably are a polycarbonate resin having a branched structure or contain a polycarbonate resin having a branched structure, and the proportion of the polycarbonate resin having a branched structure in 100 mass % for the total of polycarbonate resins (A1) and (A2) is preferably 10 to 100 mass %. When the branched structure is in a range at or above a certain level, an excellent shape stability is exhibited during combustion and this is thus preferred from the standpoint of achieving a low heat release and a low smoke generation. The proportion of the polycarbonate resin having a branched structure is more preferably 20 to 100 mass %, still more preferably 25 to 100 mass %, and particularly preferably 30 to 100 mass %.

With regard to the polycarbonate resin having a branched structure, either or both of polycarbonate resins (A1) and (A2) may be a polycarbonate resin having a branched structure, and a polycarbonate resin having a branched structure may be mixed as a portion of the polycarbonate resin (A1) and/or as a portion of the polycarbonate resin (A2).

[Proportions for Polycarbonate Resins (A1) and (A2)]

The ratio in the first invention between the contents of the polycarbonate resin (A1) and the polycarbonate resin (A2) is polycarbonate resin (A1)/polycarbonate resin (A2)=100/0 to 10/90 as the mass ratio between the two. By having polycarbonate resins (A1) and (A2) reside in this ratio, an excellent char formation is exhibited during combustion and the appearance of a low heat release and a low smoke generation is facilitated.

Expressed as polycarbonate resin (A1)/polycarbonate resin (A2), the preferred content ratio is 100/0 to 20/80, while 100/0 to 30/70 is more preferred, 100/0 to 40/60 is still more preferred, and 100/0 to 50/50 is particularly preferred.

[Phosphorus Flame Retardant (B)]

Considered per 100 mass parts of the total of the polycarbonate resins (A1) and (A2), the polycarbonate resin composition according to the first invention contains 3 to 20 mass parts of a phosphorus flame retardant (B) that is a phosphazene compound and/or a condensed phosphate ester and 2 to 20 mass parts of a silicone flame retardant (C). As a result of the incorporation of both this phosphorus flame retardant (B) that is a phosphazene compound and/or a condensed phosphate ester and the silicone flame retardant (C), the flame retardancy of the polycarbonate resin composition according to the first invention can be enhanced up to a level that can clear the previously referenced European Railway Standard for Fire Safety.

A phosphazene compound and/or a condensed phosphate ester is used as the phosphorus flame retardant (B) in the first invention.

[Condensed Phosphate Ester]

The phosphate ester compound represented by the following general formula (3) is particularly preferred for the condensed phosphate ester.

[C9]

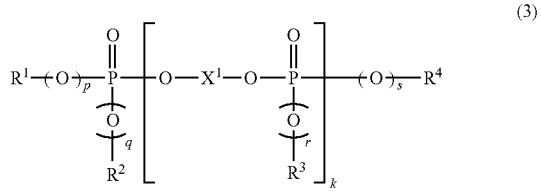

(3)

(In the formula, $R^1$, $R^2$, $R^3$, and $R^4$ each represent an alkyl group having 1 to 6 carbons or an aryl group having 6 to 20 carbons and possibly substituted by an alkyl group; p, q, r and s are each 0 or 1; k is an integer from 1 to 5; and $X^1$ represents an arylene group.)

The phosphate ester compound represented by general formula (3) may be a mixture of compounds in which k has different values, and k is then the average value for the mixture in the case of a mixture of phosphate esters in which this k is different. In the case of a mixture of compounds having different values of k, the average value of k is preferably in the range from 1 to 2, more preferably from 1 to 1.5, still more preferably from 1 to 1.2, and particularly preferably from 1 to 1.15.

In addition, the $X^1$ represents a divalent arylene group, for example, a divalent group derived from a dihydroxy compound such as resorcinol, hydroquinone, bisphenol A, 2,2'-dihydroxybiphenyl, 2,3'-dihydroxybiphenyl, 2,4'-dihydroxybiphenyl, 3,3'-dihydroxybiphenyl, 3,4'-dihydroxybiphenyl, 4,4'-dihydroxybiphenyl, 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, and 2,7-dihydroxynaphthalene. Among the preceding, a divalent group derived from resorcinol, bisphenol A, or 3,3'-dihydroxybiphenyl is particularly preferred.

p, q, r, and s in general formula (3) each represent 0 or 1 with 1 being preferred therebetween.

$R^1$, $R^2$, $R^3$, and $R^4$ each represent an alkyl group having 1 to 6 carbons or an aryl group having 6 to 20 carbons and possibly substituted by an alkyl group. This aryl group can be exemplified by a phenyl group, a cresyl group, a xylyl group, an isopropylphenyl group, a butylphenyl group, a tert-butylphenyl group, a di-tert-butylphenyl group, a p-cumylphenyl group, and so forth, with a phenyl group, a cresyl group, and a xylyl group being more preferred.

Specific examples of the condensed phosphate esters represented by general formula (3) are condensed phosphate esters such as resorcinol bis(diphenyl phosphate) (RDP), resorcinol bis(dixylenyl phosphate) (RDX), bisphenol A bis(diphenyl phosphate) (BDP), biphenyl bis(diphenyl phosphate), and tetraphenyl-p-phenylene diphosphate.

Besides those provided above, the phosphate ester compound of course also includes, e.g., 10-(2,5-dihydroxyphenyl)-10H-9-oxa-10-phosphaphenanthrene-10-oxide, 10-(2,3-dihydroxyphenyl)-10H-9-oxa-10-phosphaphenanthrene-10-oxide, and 10-(2,4-dihydroxyphenyl)-10H-9-oxa-10-phosphaphenanthrene-10-oxide.

The phosphate ester compound is preferably an aromatic condensed phosphate compound.

The acid value of the condensed phosphate ester compound represented by general formula (3) is preferably not more than 0.2 mg KOH/g, more preferably not more than 0.15 mg KOH/g, still more preferably not more than 0.1 mg KOH/g, and particularly preferably not more than 0.05 mg KOH/g. The lower limit for this acid value may be substantially 0.

A single condensed phosphate ester flame retardant (B) may be used or any combination of two or more in any ratio may be used.

[Phosphazene Compound]

The phosphazene compound is particularly preferably a phosphazene compound represented by the following general formula (4) or (5).

[C10]

(4)

[C11]

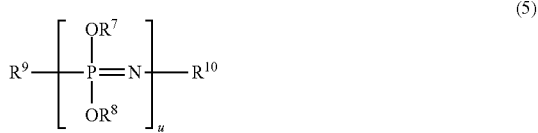

(5)

Phosphazene compounds represented by general formulas (4) and (5) can be exemplified by cyclic and/or linear $C_{1-6}$-alkyl-$C_{6-20}$-aryloxyphosphazenes such as phenoxyphosphazenes, (poly)tolyloxyphosphazenes (for example, o-tolyloxyphosphazene, m-tolyloxyphosphazene, p-tolyloxyphosphazene, o,m-tolyloxyphosphazene, o,p-tolyloxyphosphazene, m,p-tolyloxyphosphazene, o,m,p-tolyloxyphosphazene, and so forth) and (poly) xylyloxyphosphazenes; and cyclic and/or linear $C_{6-20}$-aryl-$C_{1-10}$-alkyl-$C_{6-20}$-aryloxyphosphazenes such as (poly) phenoxytolyloxyphosphazenes (for example, phenoxy-o-tolyloxyphosphazene, phenoxy-m-tolyloxyphosphazene, phenoxy-p-tolyloxyphosphazene, phenoxy-o,m-tolyloxyphosphazene, phenoxy-o,p-tolyloxyphosphazene, phenoxy-m,p-tolyloxyphosphazene, phenoxy-o,m,p-tolyloxyphosphazene), (poly) phenoxyxylyloxyphosphazenes, and (poly) phenoxytolyloxyxylyloxyphosphazenes.

The following are preferred among the preceding: cyclic and/or linear phenoxyphosphazene, cyclic and/or linear $C_{1-3}$-alkyl-$C_{6-20}$-aryloxyphosphazene, and $C_{6-20}$-aryloxy-$C_{1-3}$-alkyl-$C_{6-20}$-aryloxyphosphazene (for example, cyclic and/or linear tolyloxyphosphazene, cyclic and/or linear phenoxytolylphenoxyphosphazene, and so forth).

$R^5$ and $R^6$ in the cyclic phosphazene compound represented by general formula (4) may be the same or different and represent an aryl group or an alkylaryl group. This aryl group and alkylaryl group can be exemplified by a phenyl group, a naphthyl group, a methylphenyl group, and a benzyl group, whereamong cyclic phenoxyphosphazenes, in which $R^5$ and $R^6$ are phenyl groups, are particularly preferred.

Such cyclic phenoxyphosphazene compounds can be exemplified by compounds, e.g., phenoxycyclotriphosphazene, octaphenoxycyclotetraphosphazene, and decaphenoxycyclopentaphosphazene, that are obtained by reacting ammonium chloride and phosphorus pentachloride at a temperature of 120° C. to 130° C. to obtain a mixture of cyclic and linear chlorophosphazenes; recovering the cyclic chlorophosphazenes, e.g., hexachlorocyclotriphosphazene, octachlorocyclotetraphosphazene, and decachlorocyclopentaphosphazene; and subsequently substituting with a phenoxy group.

The t in general formula (4) represents an integer from 3 to 25, whereamong compounds in which t is an integer from 3 to 8 are preferred; a mixture of compounds having different values for t may also be used. Among the preceding, mixtures are preferred in which compounds with t=3 are at least 50 mass %, compounds with t=4 are 10 to 40 masse, and the total for compounds with a t of 5 or more is not more than 30 mass %.

$R^7$ and $R^8$ in general formula (5) may be the same or different and represent an aryl group or an alkylaryl group. This aryl group and alkylaryl group can be exemplified by a phenyl group, a naphthyl group, a methylphenyl group, and a benzyl group, whereamong linear phenoxyphosphazenes, in which $R^7$ and $R^8$ are phenyl groups, are particularly preferred.

Such linear phenoxyphosphazene compounds are, for example, compounds obtained by the ring-opening polymerization at a temperature of 220° C. to 250° C. of the hexachlorocyclotriphosphazene yielded by the method described above, followed by subjecting the resulting linear dichlorophosphazene having a degree of polymerization of 3 to 10,000 to substitution with a phenoxy group.

In addition, $R^9$ represents at least one selected from a —N=P(OR$^7$)$_3$ group, a —N=P(OR$^8$)$_3$ group, a —N=P(O)OR$^7$ group, and a —N=P(O)OR$^8$ group, while $R^{10}$ represents at least one selected from a —P(OR$^7$)$_4$ group, a —P(OR$^8$)$_4$ group, a —P(O) (OR$^7$)$_2$ group, and a —P(O) (OR$^8$)$_2$ group.

The u in general formula (5) represents an integer from 3 to 10,000 and is preferably 3 to 1,000, more preferably 3 to 100, and still more preferably 3 to 25.

The phosphazene compound may be a crosslinked phosphazene compound provided by the crosslinking of a portion of the phosphazene compound. The heat resistance is increased by the presence of such a crosslinked structure.

Such a crosslinked phosphazene compound can be exemplified by compounds having the crosslinking structure represented by the following general formula (6), for example, compounds having a 4,4'-diphenylene group-crosslinked structure, e.g., compounds having a 4,4'-sulfonyldiphenylene (i.e., a bisphenol S residue)-crosslinked structure, compounds having a 2,2-(4,4'-diphenylene) isopropylidene group-crosslinked structure, compounds having a 4,4'-oxydiphenylene group-crosslinked structure, and compounds having a 4,4'-thiodiphenylene group-crosslinked structure.

[C12]

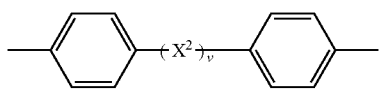

(6)

[In formula (6), $X^2$ is —C(CH$_3$)$_2$—, —SO$_2$—, —S—, or —O— and v is 0 or 1.]

The following are preferred for the crosslinked phosphazene compound from the standpoint of the flame retardancy: crosslinked phenoxyphosphazene compounds provided by the crosslinking, through a crosslinking group represented by general formula (4), of a cyclic phenoxyphosphazene compound in which $R^5$ and $R^6$ in general formula (4) are phenyl groups, and crosslinked phenoxyphosphazene compounds provided by the crosslinking, through a crosslinking group represented by general formula (6), of a linear phenoxyphosphazene compound in which $R^7$ and $R^8$ in general formula (5) are phenyl groups. More preferred are crosslinked phenoxyphosphazene compounds provided by the crosslinking of a cyclic phenoxyphosphazene compound through a crosslinking group represented by general formula (6).

The phenylene group content in the crosslinked phenoxyphosphazene compound—with reference to the total number of phenyl and phenylene groups in the cyclic phosphazene compound represented by general formula (4) and/or the linear phenoxyphosphazene compound represented by general formula (5)—is generally 50% to 99.9% and preferably 70% to 90%. The crosslinked phenoxyphosphazene compound is particularly preferably a compound that does not have a free hydroxyl group in the molecule.

Viewed from the standpoint of the flame retardancy and mechanical characteristics, the phosphazene compound is preferably at least one selected from the group consisting of cyclic phenoxyphosphazene compounds represented by general formula (4) and crosslinked phenoxyphosphazene compounds provided by the crosslinking through a crosslinking group of a linear phenoxyphosphazene compound represented by general formula (5).

The content in the first invention of the phosphorus flame retardant (B) that is a condensed phosphate ester compound and/or a phosphazene compound is, as described above, 3 to 20 mass parts per 100 mass parts of the total of the polycarbonate resins (A1) and (A2). Less than 3 mass parts and more than 20 mass parts are undesirable because in the former case the expression of a satisfactorily low heat release and a satisfactorily low smoke generation is impaired while in the latter case the ability to withstand moist heat and the heat resistance, e.g., the heat deflection temperature and so forth, are reduced. The content of the phosphorus flame retardant (B) is preferably 3.5 to 20 mass parts and is more preferably 4 to 20 mass parts, still more preferably 5 to 20 mass parts, even more preferably 8 to 20 mass parts, and particularly preferably 10 to 20 mass parts. The upper limit on the content is more preferably 18 mass parts, and thus 4 to 18 mass parts is more preferred, 5 to 18 mass parts is still more preferred, 8 to 18 mass parts is even more preferred, and 10 to 18 mass parts is particularly preferred.

[Silicone Flame Retardant (C)]

The silicone flame retardant (C) is preferably a polyorganosiloxane. Polyorganosiloxanes having an aromatic group, e.g., a phenyl group and so forth, in the molecule are preferred for this polyorganosiloxane. Such polyorganosiloxanes can be exemplified by polydiphenylsiloxanes, polymethylphenylsiloxanes, polydimethyldiphenylsiloxanes, and phenyl group-containing cyclic siloxanes.

In addition to the organic groups indicated above, the polyorganosiloxane may contain a functional group, e.g., a silanol group, an epoxy group, an alkoxy group, a hydrosilyl (SiH) group, a vinyl group, and so forth, in the molecule. Due to the presence of these special functional groups, the compatibility between the polyorganosiloxane and the polycarbonate resin is improved and/or the reactivity during combustion is enhanced, and the flame retardancy is then raised as a result.

The silanol group content of the polyorganosiloxane is generally at least 1 mass % and is preferably at least 2 mass %, more preferably at least 3 mass %, and particularly preferably at least 5 mass %, and is generally not more than 10 mass %, preferably not more than 9 mass %, more preferably not more than 8 mass %, and particularly preferably not more than 7.5 mass %. A high flame-retarding effect tends to be generated by having the silanol group content be in the indicated range; in addition, the heat stability and moist heat stability of the polycarbonate resin composition may undergo a substantial decline when the silanol group content is too large.

In addition to a hydroxyl group, the polyorganosiloxane may contain an alkoxy group, but preferably in an amount not more than 10 mass %. When the alkoxy group exceeds 10 mass %, gelation is prone to occur and a decline in the mechanical properties of the polycarbonate resin composition may be induced.

The average molecular weight (mass-average molecular weight) of the polyorganosiloxane is not particularly limited and may be selected as appropriate for use, but is generally at least 450 and is preferably at least 1,000, more preferably at least 1,500, and particularly preferably at least 1,700 and is generally not more than 300,000 and preferably not more than 100,000, more preferably not more than 20,000, and particularly preferably not more than 15,000. The production of a polyorganosiloxane having a mass-average molecular weight less than the lower limit on the indicated range is problematic, and the heat resistance of such a polyorganosiloxane may be drastically reduced. In the case of a polyorganosiloxane having a mass-average molecular weight in excess of the upper limit on the indicated range, due to a poor dispersibility the flame retardancy assumes a declining trend and the mechanical properties of the polycarbonate resin composition also assume a declining trend.

The mass-average molecular weight of the polyorganosiloxane is generally measured by gel permeation chromatography (GPC).

The silicone flame retardant (C) is also preferably a graft copolymer that contains polyorganosiloxane. This may be a modified polyorganosiloxane that contains polyorganosiloxane such as described above and another (co)polymer, for example, polybutyl acrylate, a butyl acrylate-styrene copolymer, and so forth, as provided by graft copolymerization. Such graft copolymers containing polyorganosiloxane are commercially available, for example, as "Kane Ace MR-01" and "Kane Ace MR-02" from the Kaneka Corporation.

A single silicone flame retardant (C) may be used by itself or a mixture of two or more may be used.

The properties of the silicone flame retardant, i.e., solid, liquid, and so forth, are not particularly limited and may be selected as appropriate for use. However, in the case of a liquid, the preferred viscosity at 25° C. is generally at least 1 centistokes (cSt) and is preferably at least 4 centistokes, and is generally not more than 500 centistokes and is preferably not more than 100 centistokes.

The content of the silicone flame retardant (C) in the first invention is 2 to 20 mass parts per 100 mass parts of the total of the polycarbonate resins (A1) and (A2). Within this range, an excellent char formation is exhibited during combustion and the occurrence of a low heat release and a low smoke generation is facilitated. The content of the silicone flame retardant (C) is preferably 3 to 18 mass parts, more preferably 4 to 16 mass parts, and particularly preferably 5 to 15 mass parts.

The total of the phosphorus flame retardant (B) and silicone flame retardant (C) contents, per 100 mass parts of the total of the polycarbonate resins (A1) and (A2), is preferably 15 to 40 mass parts and more preferably 15 to 30 mass parts. Within this range, excellent char formation occurs during combustion and in addition there is little combustion-induced deformation and the occurrence of a low heat release and a low smoke generation is facilitated. The total content of (B) and (C) is more preferably 20 to 30 mass parts.

[Inorganic Filler (D)]

The resin composition in the first invention contains an inorganic filler (D).

The inorganic filler (D) can be specifically exemplified by glass fillers such as glass fiber (chopped strand), short glass fiber (milled fiber), glass flakes, and glass beads; carbon fillers such as carbon fiber, short carbon fiber, carbon nanotubes, and graphite; whiskers such as potassium titanate and aluminum borate; silicate compounds such as talc, mica, wollastonite, kaolinite, xonotlite, sepiolite, attapulgite, montmorillonite, bentonite, and smectite; as well as silica, alumina, and calcium carbonate.

Among the preceding, talc, glass fiber, silica, and wollastonite are preferred, with talc and glass fiber being more preferred and talc being particularly preferred.

The shape of the inorganic filler (D) may be freely selected and may be, for example, fibrous, acicular, plate-shaped, granular, irregular, and so forth.

When the shape of, e.g., the glass fiber and so forth, is fibrous, a selection from, e.g., long fiber types (roving) and short fiber types (chopped strand), can be used as the fiber. The average fiber diameter is preferably 6 to 16 μm and is more preferably 6 to 13 μm. The mechanical properties can be more effectively improved through the use of such fiber diameters. In addition, the average fiber length is preferably 0.1 to 20 mm and is more preferably 1 to 10 mm. The reinforcing effect may be inadequate when the average fiber length is less than 0.1 mm, while at more than 20 mm melt-kneading with the polycarbonate resin and molding of the polycarbonate resin composition may be problematic.

When the shape of the inorganic filler (D) is other than fibrous, the average particle diameter is then preferably 0.05 to 50 μm and more preferably 0.1 to 25 μm. When the average particle diameter is too small, the occurrence of an inadequate reinforcing effect is facilitated and an excessive heat distortion may occur during combustion. When, conversely, the average particle diameter is too large, the external appearance of the molded article is easily negatively affected and the impact resistance may also be inadequate. The most preferred average particle diameter for the inorganic filler (D) is 0.2 to 15 μm and particularly 0.3 to 10 μm.

As previously indicated, talc is most preferred for the inorganic filler (D), and the particle diameter of the talc, as the average particle diameter ($D_{50}$), is preferably 1 to 20 μm, more preferably 1 to 15 μm, and still more preferably 2 to 13 μm. A particle diameter of less than 1 μm is undesirable for the following reasons: the inhibitory effect on the heat distortion during combustion is reduced, and the resin component may be degraded due to an excessively large surface area in the resin composition. It is undesirable for the average particle diameter to exceed 20 μm because the specific surface area in the resin composition is then small and a char formation effect during combustion capable of producing flame retardancy is impeded.

The particle diameter of the talc refers to the $D_{50}$ measured by a laser diffraction scattering procedure (ISO 13320-1).

In order to increase the affinity with the polycarbonate resin (A) and enhance the adhesiveness therewith, the surface of the inorganic filler (D) is preferably treated with a surface treatment agent, e.g., a silane coupling agent, or a sizing agent. The silane coupling agent can be exemplified by aminosilanes, epoxysilanes, allylsilanes, vinylsilanes, and so forth. The sizing agent can also contain components such as epoxy resins, urethane resins, acrylic resins, antistatic agents, lubricants, water repellents, and so forth.

Two or more inorganic fillers (D) may be used in combination. When two or more species of talc are used in combination, two species, i.e., one having a smaller average particle diameter in the preferred particle diameter range and one having a larger average particle diameter in the preferred particle diameter range, are more preferably used in combination. Specifically, the appearance of an advantageous balance between char formation during combustion and the suppression of heat deflection is facilitated when talcs with an average particle diameter of 1 to 6 μm and an average particle diameter of 8 to 20 μm, preferably an average particle diameter of 2 to 6 μm and an average particle diameter of 8 to 15 μm, and more preferably an average particle diameter of 3 to 6 μm and an average particle diameter of 8 to 12 μm are used in combination.

The content of the inorganic filler (D) in the first invention is 3 to 100 mass parts per 100 mass parts of the total of polycarbonate resins (A1) and (A2). At less than 3 mass parts, the shape stabilizing effect during combustion is weak and the low heat release performance and low smoke generation performance are inadequate. At more than 100 mass parts, due to the wick effect of the inorganic filler, the emergence of combustion components to the surface during combustion is substantial, and as a consequence the low heat release performance and low smoke generation performance readily become inadequate. The content of the inorganic filler (D) is preferably at least 5 mass parts, more preferably at least 6 mass parts, and still more preferably at least 7 mass parts, and is preferably not more than 80 mass parts, more preferably not more than 70 mass parts, and still more preferably not more than 50 mass parts. The content of the inorganic filler (D) is more preferably 15 to 50 mass parts and is still more preferably 18 to 50 mass parts, even more preferably 25 to 50 mass parts, and particularly preferably 30 to 50 mass parts.

When the inorganic filler (D) is talc, the amount of talc is preferably larger than normal from the standpoint of suppressing heat deflection during combustion, and, considered per 100 mass parts of the total of polycarbonate resins (A1) and (A2), the content is preferably 18 to 50 mass parts, more preferably 25 to 50 mass parts, still more preferably 30 to 50 mass parts, and particularly preferably 30 to 45 mass parts.

The ratio [(B)+(C)]/(D) between the total content of the phosphorus flame retardant (B) and silicone flame retardant (C) and the content of the inorganic filler (D) is preferably not more than 2 in the first invention. A content ratio in excess of 2 is undesirable because, in flame retardancy tests for, e.g., railway vehicles and aircraft, where the resin composition according to the present invention is used to particular advantage, the shape stabilizing effect of the inorganic filler (D) then becomes inadequate and substantial swelling and deformation of the test specimen during flame retardancy testing may be produced.

[(B)+(C)]/(D) is more preferably not more than 1.5, and its lower limit is preferably 0.5.

When, in particular, the phosphorus flame retardant (B) is a condensed phosphate ester, this content ratio is preferably not more than 1.5 and is preferably at least 0.3. When the phosphorus flame retardant (B) is a phosphazene compound, this content ratio is preferably not more than 1.5 and is more preferably not more than 1.0 and is preferably at least 0.3.

[Fluoropolymer (E)]

The polycarbonate resin composition preferably contains a fluoropolymer (E) in the first invention. Through the incorporation of the fluoropolymer (E), the melt properties of the resin composition can be improved and the suppression of dripping during combustion can be enhanced.

The fluoropolymer (E) can be exemplified by fluoroolefin polymers. Fluoroolefin polymers are generally polymers and copolymers that contain a fluoroethylene structure. Specific examples are difluoroethylene polymers, tetrafluoroethylene polymers, tetrafluoroethylene/hexafluoropropylene copolymer polymers, and so forth. Tetrafluoroethylene polymers are preferred among the preceding. This fluoroethylene resin can be a fibrillatable fluoroethylene resin.

Fibrillatable fluoroethylene polymers can be exemplified by "Teflon (registered trademark) 6J" from Du Pont-Mitsui Fluorochemicals Co., Ltd., and "Polyflon (registered trademark) F201L", "Polyflon (registered trademark) F103", and "Polyflon (registered trademark) FA500B" from Daikin Industries, Ltd. Commercially available water-based dispersions of fluoroethylene polymers can be exemplified by "Teflon (registered trademark) 30J" and "Teflon (registered trademark) 31-JR" from Du Pont-Mitsui Fluorochemicals Co., Ltd. and "Fluon (registered trademark) D-1" from Daikin Industries, Ltd. A fluoroethylene polymer having a multilayer structure and provided by the polymerization of vinyl monomer may also be used, and such fluoroethylene polymers can be exemplified by polystyrene-fluoroethylene composites, polystyrene-acrylonitrile-fluoroethylene composites, polymethyl methacrylate-fluoroethylene composites, and polybutyl methacrylate-fluoroethylene composites and can be specifically exemplified by "Metablen (registered trademark) A-3800" from Mitsubishi Rayon Co., Ltd. and "Blendex (registered trademark) 449" from GE Specialty Chemicals, Inc.

A single anti-dripping agent may be incorporated or two or more may be incorporated in any combination and any ratio.

The content of the fluoropolymer (E) in the first invention is 0.05 to 3 mass parts per 100 mass parts of the total of the polycarbonate resins (A1) and (A2). When the content of the fluoropolymer (E) is less than 0.05 mass parts, the flame retardancy-enhancing effect provided by the fluoropolymer (E) is prone to be inadequate. A content in excess of 3 mass parts facilitates the occurrence of defects in the external appearance of the molded article provided by molding of the resin composition and facilitates the appearance of reductions in the mechanical strength and transparency. The content of the fluoropolymer (E) is more preferably 0.05 to 1.5 mass parts, still more preferably 0.08 to 1 mass parts, and particularly preferably 0.08 to 0.5 mass parts.

[Organic Acid (F)]

The polycarbonate resin composition in the first invention preferably also contains an organic acid (F).

When, for example, a basic inorganic compound is used for the inorganic filler (D), the organic acid (F) functions to neutralize this during molding of the resin composition and to improve the melt stability of the composition.

The organic acid (F) is preferably an organic compound that contains in its molecular structure at least one of a —SO₃H group, a —COOH group, and a —POH group, i.e., is preferably an organic sulfonic acid, organic phosphoric acid, or organic carboxylic acid, among which organic sulfonic acids and organic phosphoric acids are more preferred and organic sulfonic acids are particularly preferred.

The following are examples of organic sulfonic acids that can be preferably used as the organic acid (F): aromatic sulfonic acids such as benzenesulfonic acid, p-toluenesulfonic acid, xylenesulfonic acid, naphthalenesulfonic acid, diisopropylnaphthalenesulfonic acid, diisobutylnaphthalenesulfonic acid, and dodecylbenzenesulfonic acid; aliphatic sulfonic acids having 8 to 18 carbons; and polymeric or oligomeric organic sulfonic acids, e.g., sulfonated polystyrene, methyl acrylate-sulfonated styrene copolymers, and so forth.

The following are examples of organic sulfonate esters that can be preferably used as the organic acid (F): methyl benzenesulfonate, ethyl benzenesulfonate, propyl benzenesulfonate, butyl benzenesulfonate, octyl benzenesulfonate, phenyl benzenesulfonate, methyl p-toluenesulfonate, ethyl p-toluenesulfonate, propyl p-toluenesulfonate, butyl p-toluenesulfonate, octyl p-toluenesulfonate, phenyl p-toluenesulfonate, methyl naphthalenesulfonate, ethyl naphthalenesulfonate, propyl naphthalenesulfonate, butyl naphthalenesulfonate, 2-phenyl-2-propyl dodecylbenzenesulfonate, and 2-phenyl-2-butyl dodecylbenzenesulfonate.

The organophosphate represented by the following general formula is also a preferred example of an organic phosphoric acid that can be preferably used as the organic acid (F). [C13]

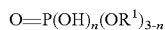

$$O=P(OH)_n(OR^1)_{3-n}$$

(In the formula, $R^1$ represents an alkyl group or aryl group. n represents an integer with a value of 1 or 2. When n=1, the two $R^1$'s may be the same as each other or may differ from one another.)

$R^1$ in the preceding general formula represents an alkyl group or an aryl group. $R^1$ is more preferably an alkyl group having at least 1 and preferably at least 2 carbons and generally not more than 30 and preferably not more than 25 carbons, or an aryl group having at least 6 and generally not more than 30 carbons. An alkyl group is more preferred for $R^1$ than an aryl group. When two or more $R^1$'s are present, the $R^1$'s may each be the same as one another or may differ from one another.

Long-chain alkyl acid phosphate compounds in which $R^1$ has 8 to 30 carbon atoms are examples of preferred compounds with the general formula given above. Alkyl groups having 8 to 30 carbon atoms can be specifically exemplified by an octyl group, a 2-ethylhexyl group, an isooctyl group, a nonyl group, an isononyl group, a decyl group, an isodecyl group, a dodecyl group, a tridecyl group, an isotridecyl group, a tetradecyl group, a hexadecyl group, an octadecyl group, an eicosyl group, and a triacontyl group.

The long-chain alkyl acid phosphates can be exemplified by octyl acid phosphate, 2-ethylhexyl acid phosphate, decyl acid phosphate, lauryl acid phosphate, octadecyl acid phosphate, oleyl acid phosphate, behenyl acid phosphate, phenyl acid phosphate, nonylphenyl acid phosphate, cyclohexyl acid phosphate, phenoxyethyl acid phosphate, alkoxypolyethylene glycol acid phosphate, bisphenol A acid phosphate, dimethyl acid phosphate, diethyl acid phosphate, dipropyl acid phosphate, diisopropyl acid phosphate, dibutyl acid phosphate, dioctyl acid phosphate, di-2-ethylhexyl acid phosphate, dioctyl acid phosphate, dilauryl acid phosphate, distearyl acid phosphate, diphenyl acid phosphate, and bis-nonylphenyl acid phosphate.

Among the preceding, octadecyl acid phosphate is preferred and is commercially available under the product name "ADK STAB AX-71" from the ADEKA Corporation.

The content of the organic acid (F) in the first invention, expressed per 100 mass parts of the total of the polycarbonate resins (A1) and (A2), is preferably 0.05 to 1 mass parts and is more preferably 0.01 to 0.5 mass parts.

[Stabilizer]

The polycarbonate resin composition preferably contains a stabilizer in the first invention.

Phosphorus stabilizers and hindered phenolic stabilizers are preferred for this stabilizer.

Any known phosphorus stabilizer can be used as the phosphorus stabilizer. Specific examples are the oxo acids of phosphorus, e.g., phosphoric acid, phosphonic acid, phosphorous acid, phosphinic acid, and polyphosphoric acid; acidic pyrophosphate metal salts, e.g., sodium acidic pyrophosphate, potassium acidic pyrophosphate, and calcium acidic pyrophosphate; salts of phosphoric acid with a Group 1 or Group 2B metal, e.g., potassium phosphate, sodium phosphate, cesium phosphate, and zinc phosphate; organophosphate compounds; organophosphite compounds; and organophosphonite compounds, with organophosphite compounds being particularly preferred.

The organophosphite compounds can be exemplified by triphenyl phosphite, tris(mononoylphenyl) phosphite, tris(mononoyl/dinonyl-phenyl) phosphite, tris(2,4-di-tert-butylphenyl) phosphite, monooctyl diphenyl phosphite, dioctyl monophenyl phosphite, monodecyl diphenyl phosphite, didecyl monophenyl phosphite, tridecyl phosphite, trilauryl phosphite, tristearyl phosphite, and 2,2-methylenebis(4,6-di-tert-butylphenyl) octyl phosphite.

These organophosphite compounds can be specifically exemplified by "ADK STAB 1178", "ADK STAB 2112", and "ADK STAB HP-10" from the ADEKA Corporation; "JP-351", "JP-360", and "JP-3CP" from Johoku Chemical Co., Ltd.; and "Irgafos 168" from BASF.

Hindered phenolic oxidation inhibitors are examples of phenolic stabilizers. Specific examples thereof are pentaerythritol tetrakis[3-(3,5-di-tert-butyl-4-hydroxyphenyl)propionate], octadecyl 3-(3,5-di-tert-butyl-4-hydroxyphenyl)propionate, thiodiethylenebis[3-(3,5-di-tert-butyl-4-hydrophenyl)propionate], N,N'-hexan-1,6-diylbis[3-(3,5-di-tert-butyl-4-hydroxyphenyl)propionamide], 2,4-dimethyl-6-(1-methylpentadecyl)phenol, diethyl [[3,5-bis(1,1-dimethylethyl)-4-hydroxyphenyl]methyl]phosphoate, 3,3', 3'',5,5',5''-hexa-tert-butyl-α,α',α''-(mesitylen-2,4,6-triyl)tri-p-cresol, 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazin-2-ylamino) phenol, and 2-[1-(2-hydroxy-3,5-di-tert-pentylphenyl) ethyl]-4,6-di-tert-pentylphenyl acrylate.

Pentaerythritol tetrakis[3-(3,5-di-tert-butyl-4-hydroxyphenyl)propionate] and octadecyl 3-(3,5-di-tert-butyl-4-hydroxyphenyl)propionate are preferred among the preceding. These phenolic oxidation inhibitors can be specifically exemplified by "Irganox 1010" and "Irganox 1076" from BASF and "ADK STAB AO-50" and "ADK STAB AO-60" from the ADEKA Corporation.

A single stabilizer may be incorporated or two or more may be incorporated in any combination and any ratio.

The content of the stabilizer in the first invention, expressed per 100 mass parts of the total of polycarbonate resins (A1) and (A2), is preferably at least 0.01 mass parts and more preferably at least 0.02 mass parts and is preferably not more than 1 mass parts, more preferably not more than 0.5 mass parts, and still more preferably not more than 0.2 mass parts.

[Other Components]

Components other than the preceding may also be incorporated on an optional basis. These additional components can be exemplified by resins other than those described in the preceding and by various resin additives.

The resin additives can be exemplified by flame retardants other than those described above, ultraviolet absorbers, mold-release agents, colorants, static inhibitors, antifogging agents, lubricants, anti-blocking agents, fluidity improvers, plasticizers, dispersing agents, and antiseptics. A single one of these resin additives may be incorporated or any combination of two or more in any proportions may be incorporated.

<Ultraviolet Absorber>

The polycarbonate resin composition preferably also contains an ultraviolet absorber in the first invention. In particular, additional enhancements in the weathering resistance are facilitated by co-use with the aforementioned phosphorus stabilizer and/or phenolic stabilizer.

The ultraviolet absorber can be exemplified by organic ultraviolet absorbers such as benzotriazole compounds, benzophenone compounds, salicylate compounds, cyanoacrylate compounds, triazine compounds, oxanilide compounds, malonate ester compounds, and hindered amine compounds. Among the preceding, benzotriazole ultraviolet absorbers, triazine ultraviolet absorbers, and malonate ester ultraviolet absorbers are more preferred.

In particular, it has been recognized that the improving effect for the weathering resistance is better for the polycarbonate resin (A1) than for the polycarbonate resin (A2) and that the color change is smaller.

The benzotriazole ultraviolet absorber can be specifically exemplified by 2-(2'-hydroxy-5'-methylphenyl)benzotriazole, 2-[2'-hydroxy-3',5'-bis($\alpha,\alpha$-dimethylbenzyl)phenyl]benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole), 2-(2'-hydroxy-3',5'-di-tert-amyl)benzotriazole, 2-(2'-hydroxy-5'-tert-octylphenyl)benzotriazole, and 2,2'-methylenebis[4-(1,1,3,3-tetramethylbutyl)-6-(2-N-benzotriazol-2-yl)phenol], among which 2-(2'-hydroxy-5'-tert-octylphenyl)benzotriazole and 2,2'-methylenebis[4-(1,1,3,3-tetramethylbutyl)-6-(2-N-benzotriazol-2-yl)phenol] are preferred and 2-(2'-hydroxy-5'-tert-octylphenyl)benzotriazole is particularly preferred.

The triazine ultraviolet absorber can be specifically exemplified by triazine ultraviolet absorbers such as 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, and 2,4-diphenyl-6-(2-hydroxy-4-butoxyethoxyphenyl)-1,3,5-triazine.

Specific examples of the malonate ester ultraviolet absorber are 2-(alkylidene)malonate esters and particularly 2-(1-arylalkylidene)malonate esters. These malonate ester ultraviolet absorbers can be specifically exemplified by "PR-25" from Clariant Japan K.K. and "B-CAP" from BASF.

The content of the ultraviolet absorber in the first invention, expressed per 100 mass parts of the total of polycarbonate resins (A1) and (A2), is preferably at least 0.05 mass parts and more preferably at least 0.1 mass parts and is preferably not more than 1 mass parts, more preferably not more than 0.6 mass parts, and still more preferably not more than 0.4 mass parts. The improvement in the weathering resistance may not be adequate when the content of the ultraviolet absorber is not more than the lower limit on the indicated range, while, e.g., mold deposits and so forth are produced and mold contamination may be caused when the content of the ultraviolet absorber exceeds the upper limit on the indicated range.

<Mold-Release Agent>

The polycarbonate resin composition preferably also contains a mold-release agent in the first invention.

The mold-release agent can be exemplified by aliphatic carboxylic acids, fatty acid esters composed of an aliphatic carboxylic acid and alcohol, aliphatic hydrocarbon compounds having a number-average molecular weight of 200 to 15,000, and polysiloxane-type silicone oils. Fatty acid esters composed of an aliphatic carboxylic acid and alcohol are more preferred in particular among the preceding.

The aliphatic carboxylic acid constituting the fatty acid ester can be exemplified by saturated or unsaturated monobasic, dibasic, or tribasic aliphatic carboxylic acids. The aliphatic carboxylic acid here also encompasses alicyclic carboxylic acids. Among these, preferred aliphatic carboxylic acids are monobasic or dibasic carboxylic acids having 6 to 36 carbons, while saturated monobasic aliphatic carboxylic acids having 6 to 36 carbons are more preferred. Specific examples of these aliphatic carboxylic acids are palmitic acid, stearic acid, caproic acid, capric acid, lauric acid, arachidic acid, behenic acid, lignoceric acid, cerotic acid, melissic acid, montanic acid, tetratriacontanoic acid, adipic acid, and azelaic acid.

The alcohol constituting the fatty acid ester can be exemplified by saturated or unsaturated monohydric alcohols and saturated or unsaturated polyhydric alcohols. This alcohol may bear a substituent such as a fluorine atom or aryl group. Monohydric or polyhydric saturated alcohols having not more than 30 carbons are preferred among these alcohols, with saturated aliphatic monohydric alcohols and polyhydric alcohols having not more than 30 carbons being more preferred. Here, aliphatic also encompasses alicyclic compounds. Specific examples of the subject alcohols are octanol, decanol, dodecanol, stearyl alcohol, behenyl alcohol, ethylene glycol, diethylene glycol, glycerol, pentaerythritol, 2,2-dihydroxyperfluoropropanol, neopentylene glycol, ditrimethylolpropane, and dipentaerythritol.

The aliphatic carboxylic acid/alcohol fatty acid ester can be specifically exemplified by beeswax (a mixture in which the major component is myristyl palmitate), stearyl stearate, behenyl behenate, stearyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate, and pentaerythritol tetrastearate. Among the preceding, the use of at least one mold-release agent selected from pentaerythritol tetrastearate, stearyl stearate, and glycerol monostearate is more preferred.

The content of the mold-release agent in the first invention, expressed per 100 mass parts of the total of polycarbonate resins (A1) and (A2), is preferably at least 0.05 mass parts and more preferably at least 0.1 mass parts, while the upper limit thereon is preferably not more than 1 mass parts, more preferably not more than 0.6 mass parts, and still more preferably not more than 0.4 mass parts. The mold-release effect may be unsatisfactory when the content of the mold-release agent is not more than the lower limit for the indicated range, while the hydrolysis resistance may be lowered and mold contamination during injection molding and so forth may be produced when the content of the mold-release agent exceeds the upper limit for the indicated range.

[Production of Polycarbonate Resin Composition]

There are no particular limitations during production of the polycarbonate resin composition in the first invention on the method for mixing the polycarbonate resin with the various components and the aforementioned additives that are blended on an optional basis, and the known methods for producing polycarbonate resin compositions can be broadly applied.

In a specific example, the various components, e.g., the polycarbonate resin (A1), polycarbonate resin (A2), phosphorus flame retardant (B), silicone flame retardant (C), inorganic filler (D), and the aforementioned additives that are blended on an optional basis, are preliminarily mixed using any of various mixers, e.g., a tumbler or Henschel mixer, followed by melt-kneading using a mixer such as a Banbury mixer, roll, Brabender, single-screw kneading extruder, twin-screw kneading extruder, or kneader.

The polycarbonate resin composition according to the present invention may also be produced, for example, without preliminarily blending the individual components, or with a preliminary blending of only a portion of the components, and carrying out melt-kneading while feeding the extruder using a feeder.

For example, a portion of the components may be preliminarily blended, supplied to an extruder, and melt-kneaded to provide a resin composition used as a masterbatch. This masterbatch is again blended with the remainder of the components followed by melt-kneading to produce the polycarbonate resin composition according to the present invention.

In another preferred procedure, the inorganic filler is added, using a side-feed method and during kneading, to a resin component that has been preliminarily put through a melt-kneading procedure, followed by the traverse of a light kneading zone and extrusion as a strand. The extruded strand is pelletized by cooling and cutting. In particular, the application of such a method when the inorganic filler (D) is a fibrous filler can suppress rupture of the fibrous inorganic filler and thus facilitates an excellent maintenance of the mechanical properties.

The polycarbonate resin composition according to the first invention preferably exhibits a maximum average rate of heat emission of not more than 120 kW/m². For the maximum average rate of heat emission, the average rate of heat emission is determined in accordance with ISO 5660-1 using a cone calorimeter from the amount of consumed oxygen by testing the obtained test specimen using conditions of a heater irradiance of 50 kW/m² and the presence of ignition, and the maximum value (unit: kW/m²) of this average rate of heat emission is taken to be the maximum average rate of heat emission. Smaller numerical values are preferred for the maximum average rate of heat emission, and the polycarbonate resin composition according to the first invention has a maximum average rate of heat emission preferably of not more than 120 kW/m², more preferably not more than 115 kW/m², and still more preferably not more than 110 kW/m².

In addition, the polycarbonate resin composition according to the first invention preferably has a specific optical density $D_s(4)$ at 4 minutes after the beginning of the test, which is an index for smoke generation, of not more than 400 and preferably has a cumulative value $VOF_4$ for the specific optical density for 4 minutes after the beginning of the test of not more than 650.

The specific optical density $D_s(4)$ and cumulative value $VOF_4$ for the specific optical density are tested in accordance with ISO 5659-2 using a single chamber smoke generation tester and conditions of a heater irradiance of 50 kW/m² and a flameless procedure to determine, as indices for smoke generation, the specific optical density $D_s(4)$ at 4 minutes after the beginning of the test and the cumulative value $VOF_4$ for the specific optical density for 4 minutes after the beginning of the test.

The specific optical density $D_s$ is calculated using the following formula from the absorbance T measured with the optical system disposed within the chamber, the volume V of the chamber, the exposed area A of the test specimen, and the optical path length L of the measurement optical system.

$$D_s = \frac{V}{A \cdot L} \log\left(\frac{100}{T}\right) \quad \text{[Math. 1]}$$

Smaller numerical values are preferred for both the specific optical density $D_s(4)$ and the cumulative value $VOF_4$ for the specific optical density, and a low specific optical density $D_s(4)$ and cumulative value $VOF_4$ for the specific optical density are indicative of a low smoke generation. The polycarbonate resin composition according to the first invention has a specific optical density $D_s(4)$ preferably of not more than 400 and more preferably not more than 350 and a cumulative value $VOF_4$ for the specific optical density preferably of not more than 650 and more preferably not more than 600.

The polycarbonate resin composition according to the first invention particularly preferably has a maximum average rate of heat emission of not more than 110 kW/m², a $D_s(4)$ of not more than 350, and a $VOF_4$ of not more than 600.

[Polycarbonate Resin Molded Articles]

A polycarbonate resin molded article is produced using the polycarbonate resin composition according to the first invention that has been described in the preceding. There are no particular limitations on the method for molding the polycarbonate resin molded article, and, for example, methods may be used that carry out molding using a heretofore known molding device, e.g., an injection molder, extrusion molder, and so forth.

Polycarbonate resin molded articles provided by molding the resin composition according to the first invention, because they possess both low heat release and low smoke generation and can clear EN 45545-2 European Railway Standard for Fire Safety and NFPA 130 Standard for Fixed Guideway Transit and Passenger Rail Systems, are particularly well suited for, for example, interior members for railway vehicles.

Preferred examples of interior members for railway vehicles are seat railings, back rests, tables, boxes, pockets, luggage racks, wall materials, ceiling materials, and so forth.

<Second Invention>

The second invention according to the present invention is described in detail in the following.

The polycarbonate resin composition according to the second invention characteristically contains 100 mass parts of a polycarbonate resin containing a polycarbonate resin (A1) having a structural unit with general formula (1) as given above and a polycarbonate resin (A2) having a structural unit with general formula (2) as given above, in a proportion of (less than 10)/(more than 90) to 0/100 for the (A1)/(A2) mass ratio; 3 to 40 mass parts of a phosphorus flame retardant (B); 2 to 40 mass parts of a silicone flame retardant (C); and 15 to 100 mass parts of an inorganic filler (D), wherein the phosphorus flame retardant (B) is a condensed phosphate ester, and does not contain a phosphazene compound or contains a phosphazene compound in a content of less than 3 mass parts.

The individual components themselves used in the polycarbonate resin composition according to the second invention of the present invention are substantially the same components as those described for the first invention of the present invention, and, unless specifically indicated otherwise, the description for the first invention as provided above is directly applied to the individual components themselves used in the second invention.

[Proportion for Polycarbonate Resins (A1) and (A2)]

The ratio in the second invention between the contents of the polycarbonate resin (A1) and the polycarbonate resin (A2) is a polycarbonate resin (A1)/polycarbonate resin (A2) of (less than 10)/(more than 90) to 0/100 for the mass ratio between the two, i.e., the polycarbonate resin (A1) is at least 0 and less than 10 and the polycarbonate resin (A2) is more than 90 and not more than 100. When the polycarbonate resins (A1) and (A2) are brought into this ratio and when the phosphorus flame retardant (B) is a condensed phosphate ester and a phosphazene compound is not incorporated, or, when it is incorporated, the phosphazene compound content is less than 3 mass parts per 100 mass parts for the total of the polycarbonate resins (A1) and (A2), an excellent char formation is exhibited during combustion and the appearance of a low heat release and a low smoke generation is made possible.

[Phosphorus Flame Retardant (B)]

The polycarbonate resin composition according to the second invention uses a condensed phosphate ester as the phosphorus flame retardant (B) and does not contain a phosphazene compound or, if it does contain a phosphazene compound, has a content thereof of less than 3 mass parts. Through the use of this condensed phosphate ester in combination with the silicone flame retardant (C), the flame retardancy of the polycarbonate resin composition according to the second invention can be enhanced up to a level that can clear the aforementioned European Railway Standard for Fire Safety.

The condensed phosphate ester and phosphazene compound are as described above.

As indicated above, the content in the second invention of the phosphorus flame retardant (B) is 3 to 40 mass parts per 100 mass parts for the total of the polycarbonate resins (A1) and (A2), and preferably the entire amount is a condensed phosphate ester. When a phosphazene compound is incorporated, its content is less than 3 mass parts. A content of the phosphorus flame retardant (B) of less than 3 mass parts is undesirable because the expression of a satisfactory low heat release performance and a satisfactory low smoke generation performance is then impaired, while at more than 40 mass parts the ability to withstand moist heat and the heat resistance, e.g., the heat deflection temperature and so forth, are reduced. The content of the phosphorus flame retardant (B) is preferably 3.5 to 20 mass parts and is more preferably 4 to 20 mass parts, still more preferably 5 to 20 mass parts, even more preferably 8 to 20 mass parts, and particularly preferably 10 to 20 mass parts. The upper limit on the content is more preferably 18 mass parts, and thus 4 to 18 mass parts is more preferred, 5 to 18 mass parts is still more preferred, 8 to 18 mass parts is even more preferred, and 10 to 18 mass parts is particularly preferred.

When a phosphazene compound is incorporated, its content is preferably less than 2.5 mass parts, more preferably less than 2.0 mass parts, and still more preferably less than 1.5 mass parts, whereamong less than 1.0 mass parts, specifically less than 0.5 mass parts, particularly less than 0.3 mass parts, and less than 0.1 mass parts are most preferred.

[Silicone Flame Retardant (C)]

The silicone flame retardant (C) is as has been described above.

The content of the silicone flame retardant (C) in the second invention is 2 to 40 mass parts with reference to 100 mass parts of the total of the polycarbonate resins (A1) and (A2). Within this range, an excellent char formation is exhibited during combustion and the occurrence of a low heat release and a low smoke generation is facilitated. The content of the silicone flame retardant (C) is preferably 3 to 18 mass parts, more preferably 4 to 16 mass parts, and particularly preferably 5 to 15 mass parts.

The total of the phosphorus flame retardant (B) and silicone flame retardant (C) contents, with reference to 100 mass parts of the total of the polycarbonate resins (A1) and (A2), is preferably 15 to 40 mass parts and more preferably 15 to 30 mass parts. Within this range, an excellent char formation occurs during combustion and in addition there is little combustion-induced deformation and the occurrence of a low heat release and a low smoke generation is facilitated. The total content of (B) and (C) is more preferably 20 to 30 mass parts.

[Inorganic Filler (D)]

The inorganic filler (D) is as described above.

The content of the inorganic filler (D) in the second invention is 15 to 100 mass parts per 100 mass parts of the total of polycarbonate resins (A1) and (A2). At less than 15 mass parts, the shape stabilizing effect during combustion is weak and the low heat release performance and low smoke generation performance are inadequate. At more than 100 mass parts, due to the candle-core effect of the inorganic filler, the emergence of combustion components to the surface during combustion is substantial, and as a consequence the low heat release performance and low smoke generation performance readily become inadequate. The content of the inorganic filler (D) is preferably at least 20 mass parts and more preferably at least 25 mass parts and is preferably not more than 80 mass parts, more preferably not more than 70 mass parts, and still more preferably not more than 50 mass parts. The content of the inorganic filler (D) is more preferably 20 to 80 mass parts and is still more preferably 20 to 70 mass parts, even more preferably 25 to 70 mass parts, and particularly preferably 30 to 60 mass parts.

When the inorganic filler (D) is talc, the amount of talc is preferably larger than normal, and, considered per 100 mass parts of the total of polycarbonate resins (A1) and (A2), is preferably 18 to 50 mass parts, more preferably 25 to 50 mass parts, still more preferably 30 to 50 mass parts, and particularly preferably 30 to 45 mass parts.

The ratio [(B)+(C)]/(D) between the total content of the phosphorus flame retardant (B) and silicone flame retardant (C) and the content of the inorganic filler (D) is preferably not more than 2 in the second invention. A content ratio in excess of 2 is undesirable because, in flame retardancy tests for, e.g., railway vehicles and aircraft, the shape stabilizing effect of the inorganic filler (D) then becomes inadequate and substantial swelling and deformation of the test specimen during flame retardancy testing may be produced.

[(B)+(C)]/(D) is more preferably not more than 1.5, its lower limit is preferably 0.5, and 0.3 to 1.5 is particularly preferred.

[Fluoropolymer (E)]

A fluoropolymer (E) is also preferably incorporated in the second invention, and this fluoropolymer (E) is in accordance with the description given above.

The content of the fluoropolymer (E) in the second invention is 0.05 to 3 mass parts per 100 mass parts of the total of the polycarbonate resins (A1) and (A2). When the content of the fluoropolymer (E) is less than 0.05 mass parts, the flame retardancy-enhancing effect provided by the fluoropolymer (E) is prone to be inadequate. A content in excess of 3 mass parts facilitates the appearance of defects in the external appearance of the molded article provided by molding of the resin composition and facilitates the appearance of reductions in the mechanical strength and transparency. The content of the fluoropolymer (E) is more preferably 0.05 to 1.5 mass parts, still more preferably 0.08 to 1 mass parts, and particularly preferably 0.08 to 0.5 mass parts.

[Organic Acid (F)]

The polycarbonate resin composition in the second invention also preferably incorporates an organic acid (F), and this organic acid (F) is in accordance with the description given above.

The amount of incorporation of the organic acid (F) in the second invention, per 100 mass parts of the total of the polycarbonate resins (A1) and (A2), is preferably 0.05 to 1 mass parts and more preferably 0.01 to 0.5 mass parts.

[Stabilizer]

The polycarbonate resin composition in the second invention also preferably incorporates a stabilizer, and this stabilizer is in accordance with the description given above.

The content of the stabilizer in the second invention, expressed per 100 mass parts of the total of polycarbonate resins (A1) and (A2), is preferably at least 0.01 mass parts and more preferably at least 0.02 mass parts and is preferably not more than 1 mass parts, more preferably not more than 0.5 mass parts, and still more preferably not more than 0.2 mass parts.

[Other Components]

Components other than the preceding may also be incorporated on an optional basis in the resin composition according to the second invention. These additional components can be exemplified by resins other than those described in the preceding and by various resin additives.

The incorporation of, e.g., a polyphenylene ether resin, polyarylate resin, polyetherimide resin, polyamide resin, and so forth, as this other resin is also preferred because this provides an additional suppression of heat release and smoke generation.

The polyphenylene ether resin is preferably a modified polyphenylene ether resin alloyed with, e.g., a high-impact polystyrene (HIPS). The polyarylate resin is a resin that contains an arylate polyester structural unit, this being the reaction product of a diphenol and an aromatic dicarboxylic acid, and a polymer provided by the polymerization of bisphenol A and phthalic acid (terephthalic acid and/or isophthalic acid) is particularly preferred. The polyetherimide resin is particularly preferably a polymer from 2,2-bis[4-(3,4-dicarboxyphenoxy)phenyl]propane and m-phenylenediamine.

When these resins are incorporated, the content, per 100 mass parts of the total of polycarbonate resins (A1) and (A2), is preferably 5 to 100 mass parts and is more preferably 10 to 60 mass parts. These may also be blended into the above-described resin composition according to the first invention, and the content in such a case is the same as indicated here.

These other resins may also be exemplified by thermoplastic polyester resins, e.g., polyethylene terephthalate resins, polytrimethylene terephthalate, and polybutylene terephthalate resins; styrenic resins such as polystyrene resins, high-impact polystyrene resins (HIPS), and acrylonitrile-styrene copolymers (AS resins); polyolefin resins such as polyethylene resins and polypropylene resins; polyurethane resins; polymethacrylate resins; polyamide resins; polyimide resins; polyphenylene sulfide resins; and polysulfone resins.

A single additional resin may be incorporated or two or more may be incorporated in any combination and any ratio.

The resin additives can be exemplified by flame retardants other than those described above, ultraviolet absorbers, mold-release agents, colorants, static inhibitors, antifogging agents, lubricants, anti-blocking agents, fluidity improvers, plasticizers, dispersing agents, and antiseptics. A single one of these resin additives may be incorporated or any combination of two or more in any proportions may be incorporated.

The description of these resin additives and their preferred contents for the second invention are the same as given in the description of the first invention.

As with the first invention, the polycarbonate resin composition according to the second invention preferably exhibits a value of not more than 120 kW/m² for the maximum average rate of heat emission, and the maximum average rate of heat emission is preferably not more than 120 kW/m², more preferably not more than 115 kW/m², and still more preferably not more than 110 kW/m².

In addition, as with the first invention, the polycarbonate resin composition according to the second invention preferably has a specific optical density $D_s(4)$ of not more than 400 and a cumulative value $VOF_4$ for the specific optical density of not more than 650.

The polycarbonate resin composition according to the second invention has a specific optical density $D_s(4)$ preferably of not more than 400 and more preferably not more than 350 and a cumulative value $VOF_4$ for the specific optical density preferably of not more than 650 and more preferably not more than 600.

As for the first invention, the polycarbonate resin composition according to the second invention particularly preferably has a maximum average rate of heat emission of not more than 110 kW/m², a $D_s(4)$ of not more than 350, and a $VOF_4$ of not more than 600.

[Polycarbonate Resin Molded Articles]

A polycarbonate resin molded article is produced using the polycarbonate resin composition according to the second invention that has been described in the preceding. There are no particular limitations on the method for molding the polycarbonate resin molded article, and, for example, methods may be used that carry out molding using a heretofore known molding device, e.g., an injection molder, extrusion molder, and so forth.

Polycarbonate resin molded articles provided by molding the resin composition according to the second invention, because they possess both low heat release and low smoke generation and can clear EN 45545-2 European Railway Standard for Fire Safety and NFPA 130 Standard for Fixed Guideway Transit and Passenger Rail Systems, are particularly well suited for, for example, interior members for railway vehicles.

Preferred examples of interior members for railway vehicles are seat railings, back rests, tables, boxes, pockets, luggage racks, wall materials, ceiling materials, and so forth.

EXAMPLES

Examples of First Invention

The first invention is specifically described in the following using examples in accordance with the first invention. However, the first invention should not be construed as being limited to or by the following examples.

The various components used in the examples and comparative examples are as indicated in the following Table 1.

TABLE 1

| component | designation | |
|---|---|---|
| polycarbonate resin (A1) | A1-1 | aromatic polycarbonate resin produced by melt transesterification using bisphenol C as a starting material viscosity-average molecular weight Mv: 28000, pencil hardness: 2H, has branched structure |
| | A1-2 | aromatic polycarbonate resin produced by interfacial polymerization using bisphenol A and bisphenol C as starting materials in a 50:50 molar ratio viscosity-average molecular weight Mv: 25000, pencil hardness: F, does not have a branched structure |
| polycarbonate resin (A2) | A2-1 | aromatic polycarbonate resin produced by melt polymerization using bisphenol A as a starting material product name: Novarex M7028B, Mitsubishi Engineering-Plastics Corporation viscosity-average molecular weight Mv: 27000, pencil hardness: 2B, has branched structure |
| | A2-2 | aromatic polycarbonate resin produced by interfacial polymerization according to Example 1 (PC-1) of WO 2011/132510, using bisphenol A as a starting material viscosity-average molecular weight: 64000, pencil hardness: 2B, does not have a branched structure |
| | A2-3 | aromatic polycarbonate resin from bisphenol A starting material product name: Iupilon E-2000, Mitsubishi Engineering-Plastics Corporation viscosity-average molecular weight: 28000, pencil hardness: 2B, does not have a branched structure |
| phosphorus flame retardant (B) | B-1 | phosphazene flame retardant phenoxyphosphazene compound product name: Rabitle FP-100, Fushimi Pharmaceutical Co., Ltd. |
| | B-2 | condensed phosphate ester flame retardant bisphenol A bisdiphenyl phosphate product name: Adeka Stab FP-600, ADEKA Corporation |
| | B-3 | condensed phosphate ester flame retardant resorcinol (dixylenyl phosphate) product name: PX-200, Daihachi Chemical Industry Co., Ltd. |
| | B-4 | condensed phosphate ester flame retardant aromatic phosphate ester compound product name: FyrolFlex Sol-DP, ICL |
| silicone flame retardant (C) | C-1 | polydimethylsiloxane/acrylate ester graft copolymer product name: KaneAce MR-02, Kaneka Corporation |
| | C-2 | polymethylphenylsiloxane product name: TSF437, Momentive |
| | C-3 | polydimethylsiloxane/acrylate ester graft copolymer product name: Metablen S-2030, Mitsubishi Chemical Corporation |
| | C-4 | polydimethylsiloxane/acrylate ester graft copolymer product name: Metablen SX-005, Mitsubishi Chemical Corporation |
| inorganic filler (D) | D-1 | talc product name: Micron White 5000S, Hayashi Kasei Co., Ltd average particle diameter $D_{50}$ = 4.75 μm |
| | D-2 | talc product name: Luzenac HAR T84, IMERYS Minerals Japan KK average particle diameter $D_{50}$ = 10.5 μm |
| | D-3 | talc, surface-treated product product name: Luzenac R7, IMERYS Minerals Japan KK average particle diameter $D_{50}$ = 5.7 μm |
| | D-4 | glass fiber product name: Chopped Strand ECS03T-571, Nippon Electric Glass Co., Ltd. diameter = 13 μm, length = 3 mm |
| | D-5 | wollastonite product name: NYGLOS8, IMERYS Minerals Japan KK average particle diameter $D_{50}$ = 12 μm |
| fluoropolymer (E) | E | fibrillatable polytetrafluoroethylene product name: Polyflon MPAFA-500H, Daikin Industries, Ltd. |
| organic acid (F) | F-1 | $O=P(OH)_n(OC_{18}H_{37})_{3-n}$ (mixture of n = 1.2) product name: Adeka Stab AX-71, ADEKA Corporation |
| | F-2 | p-toluenesulfonic acid monohydrate Wako Pure Chemical Industries, Ltd. |
| stabilizer (G) | G | phosphite heat stabilizer tris(2,4-di-tert-butylphenyl) phosphite product name: Adeka Stab 2112, ADEKA Corporation |

The polycarbonate resin (A1-1) used as a polycarbonate resin (A1) was produced by the following method.
<Production of Polycarbonate Resin (A1-1) by Melt Transesterification Method>

26.14 moles (6.75 kg) of 2,2-bis(3-methyl-4-hydroxyphenyl)propane (i.e., bisphenol C, "BPC" in the following) and 26.66 moles (5.71 kg) diphenyl carbonate were introduced into an SUS reactor (40 liter internal capacity) equipped with a stirrer and distillation condenser; the interior of the reactor was substituted with nitrogen gas; and the temperature was then raised over 30 minutes to 220° C. in a nitrogen gas atmosphere.

Then, the reaction liquid in the reactor was stirred; cesium carbonate ($Cs_2CO_3$) was added to the melt reaction liquid as a transesterification reaction catalyst to provide $1.5 \times 10^{-6}$ mole per 1 mole of the BPC; and the reaction liquid was stirred and matured for 30 minutes at 220° C. in a nitrogen gas atmosphere. The pressure in the reactor was reduced at the same temperature to 100 Torr over 40 minutes and a reaction was run for 100 minutes while distilling out the phenol.

The pressure in the reactor was then reduced to 3 Torr while raising the temperature to 280° C. over 60 minutes and phenol was distilled out in an amount corresponding to approximately the entire stoichiometric amount. The pressure in the reactor was subsequently maintained at less than 1 Torr at the same temperature, and the polycondensation reaction was finished by continuing to react for an additional 80 minutes. During this time, the stirring rotation rate by the stirrer was 38 rpm; the reaction liquid temperature immediately prior to the end of the reaction was 300° C.; and the stirring power was 1.40 kW.

While in the melt state, the reaction liquid was subsequently transferred to a twin-screw extruder, and the reaction liquid was kneaded while supplying, from the first supply port of the twin-screw extruder, butyl p-toluenesulfonate in an amount that was four times that of the cesium carbonate on a molar basis. The reaction solution was then passed through the die of the twin-screw extruder and extruded in strand form and cut with a cutter to obtain carbonate resin pellets.

The properties of the obtained polycarbonate resin (A1-1) were as follows:
pencil hardness: 2H, viscosity-average molecular weight (Mv): 28,000, branched structure=present.

The polycarbonate resin (A1-2) used as a polycarbonate resin (A1) is a polycarbonate resin produced by interfacial polymerization in accordance with the method described in paragraph [0132] of JP 2013-112780 A, and has the following properties:
pencil hardness: F, viscosity-average molecular weight (Mv): 25,000, branched structure=not present.

Examples 1 to 68 and Comparative Examples 1 to 7

The components indicated above were blended and mixed in the proportions (mass parts in all instances) given in Table 2 below and kneaded at a barrel temperature of 280° C. using a twin-screw extruder ("TEX30 XCT", The Japan Steel Works, Ltd.) to produce polycarbonate resin composition pellets. The obtained pellets were dried for 5 hours at 80° C., followed by test specimen fabrication according to the following procedure and evaluation as described below.

Using a J55AD injection molder from The Japan Steel Works, Ltd., the resin pellets obtained as described above were injection molded under conditions of a resin temperature of 280° C. and a mold temperature of 80° C. to produce a length 100 mm×width 100 mm×thickness 3 mm plate-shaped test specimen.

[Maximum Average Rate of Heat Emission]

Using a Cone calorimeter C3 from Toyo Seiki Seisakusho, Ltd. and operating in accordance with ISO 5660-1, testing was performed using conditions of a heater irradiance of 50 $kW/m^2$ and the presence of ignition; the average rate of heat emission was calculated from the amount of oxygen consumption; and the maximum value of this average rate of heat emission was used as the maximum average rate of heat emission (unit: $kW/m^2$). Smaller numerical values for the maximum average rate of heat emission are preferred.

[Smoke Generation Test]

Operating in accordance with ISO 5659-2, the aforementioned test specimen was cut to length 75 mm×width 75 mm×thickness 3 mm and the following were measured as smoke generation indexes using an "M-323 Series" from Fire Testing Technology, Ltd., a heater irradiance of 50 $kW/m^2$, and a flameless procedure: the specific optical density $D_s(4)$ at 4 minutes after the start of the test, and the cumulative value $VOF_4$ for the specific optical density for 4 minutes after the start of the test.

Using the values of the maximum average rate of heat emission, the specific optical density $D_s(4)$, and the cumulative value $VOF_4$ for the specific optical density, an overall evaluation of the flame retardancy was made using the criteria in the following five-level scale A to E.

A: The maximum average rate of heat emission is not more than 110 $kW/m^2$, $D_s(4)$ is not more than 350, and $VOF_4$ is not more than 600.

B: The maximum average rate of heat emission is not more than 115 $kW/m^2$, $D_s(4)$ is not more than 400, and $VOF_4$ is not more than 650.

C: The maximum average rate of heat emission is not more than 120 $kW/m^2$, $D_s(4)$ is not more than 500, and $VOF_4$ is not more than 700.

D: The maximum average rate of heat emission is not more than 150 $kW/m^2$, $D_s(4)$ is not more than 600, and $VOF_4$ is not more than 1,000.

E: None of the A to D criteria are satisfied.

The results of the evaluations are given in the following Tables 2 to 10.

TABLE 2

| component | designation | examples | | | | | | | | |
| --- | --- | --- | --- | --- | --- | --- | --- | --- | --- | --- |
| | | 1 | 2 | 3 | 4 | 5 | 6 | 7 | 8 | 9 |
| PC resin (A1) | A1-1 | 100 | 75 | 50 | 15 | 50 | 15 | 50 | 100 | 100 |
| PC resin (A2) | A2-1 | 0 | 25 | 50 | 0 | 0 | 0 | 0 | 0 | 0 |
| | A2-2 | 0 | 0 | 0 | 85 | 50 | 0 | 0 | 0 | 0 |
| | A2-3 | 0 | 0 | 0 | 0 | 0 | 85 | 50 | 0 | 0 |

TABLE 2-continued

| component | designation | 1 | 2 | 3 | 4 | 5 | 6 | 7 | 8 | 9 |
|---|---|---|---|---|---|---|---|---|---|---|
| phosphorus flame retardant (B) | B-1 | 11 | 11 | 11 | 11 | 11 | 11 | 11 | 5 | 18 |
| silicone flame retardant(C) | C-1 | 7 | 7 | 7 | 7 | 7 | 7 | 7 | 7 | 7 |
|  | C-2 | 0 | 0 | 0 | 0 | 0 | 0 | 0 | 0 | 0 |
| inorganic filler (D) | D-1 | 20 | 20 | 20 | 20 | 20 | 20 | 20 | 20 | 20 |
|  | D-2 | 0 | 0 | 0 | 0 | 0 | 0 | 0 | 0 | 0 |
| fluoropolymer (E) | E | 0.2 | 0.2 | 0.2 | 0.2 | 0.2 | 0.2 | 0.2 | 0.2 | 0.2 |
| organic acid (F) | F-1 | 0.14 | 0.14 | 0.14 | 0.14 | 0.14 | 0.14 | 0.14 | 0.14 | 0.14 |
|  | F-2 | 0 | 0 | 0 | 0 | 0 | 0 | 0 | 0 | 0 |
| stabilizer (G) | G | 0.07 | 0.07 | 0.07 | 0.07 | 0.07 | 0.07 | 0.07 | 0.07 | 0.07 |
| (A1)/(A2) mass ratio | | 100/0 | 75/25 | 50/50 | 15/85 | 50/50 | 15/85 | 50/50 | 100/0 | 100/0 |
| proportion of branched structure-bearing PC resin (mass %) | | 100 | 100 | 100 | 15 | 50 | 15 | 50 | 100 | 100 |
| [(B) + (C)]/(D) | | 0.9 | 0.9 | 0.9 | 0.9 | 0.9 | 0.9 | 0.9 | 0.6 | 1.25 |
| maximum average rate of heat emission (kW/m$^2$) | | 99 | 107 | 106 | 110 | 109 | 111 | 108 | 100 | 101 |
| Ds(4) | | 347 | 280 | 330 | 378 | 352 | 382 | 354 | 346 | 323 |
| VOF$_4$ | | 558 | 530 | 636 | 678 | 625 | 673 | 639 | 670 | 630 |
| overall evaluation of flame retardancy | | A | A | B | C | B | C | B | C | B |

TABLE 3

| component | designation | 10 | 11 | 12 | 13 | 14 | 15 | 16 | 17 |
|---|---|---|---|---|---|---|---|---|---|
| PC resin (A1) | A1-1 | 100 | 100 | 100 | 100 | 100 | 100 | 100 | 100 |
| PC resin (A2) | A2-1 | 0 | 0 | 0 | 0 | 0 | 0 | 0 | 0 |
|  | A2-2 | 0 | 0 | 0 | 0 | 0 | 0 | 0 | 0 |
|  | A2-3 | 0 | 0 | 0 | 0 | 0 | 0 | 0 | 0 |
| phosphorus flame retardant (B) | B-1 | 11 | 11 | 11 | 11 | 11 | 11 | 11 | 11 |
| silicone flame retardant (C) | C-1 | 3 | 15 | 7 | 7 | 7 | 7 | 7 | 7 |
|  | C-2 | 0 | 0 | 4 | 0 | 0 | 0 | 0 | 0 |
| inorganic filler (D) | D-1 | 20 | 20 | 25 | 10 | 45 | 20 | 20 | 20 |
|  | D-2 | 0 | 0 | 0 | 0 | 0 | 0 | 0 | 0 |
| fluoropolymer (E) | E | 0.2 | 0.2 | 0.2 | 0.2 | 0.2 | 2 | 0 | 0.2 |
| organic acid (F) | F-1 | 0.14 | 0.14 | 0.14 | 0.14 | 0.14 | 0.14 | 0 | 0.14 |
|  | F-2 | 0 | 0 | 0 | 0 | 0 | 0 | 0 | 0.63 |
| stabilizer (G) | G | 0.07 | 0.07 | 0.07 | 0.07 | 0.07 | 0.07 | 0.07 | 0.07 |
| (A1)/(A2) mass ratio | | 100/0 | 100/0 | 100/0 | 100/0 | 100/0 | 100/0 | 100/0 | 100/0 |
| proportion of branched structure-bearing PC resin (mass %) | | 100 | 100 | 100 | 100 | 100 | 100 | 100 | 100 |
| [(B) + (C)]/(D) | | 0.7 | 1.3 | 0.88 | 1.8 | 0.4 | 0.9 | 0.9 | 0.9 |
| maximum average rate of heat emission (kW/m$^2$) | | 102 | 100 | 111 | 112 | 90 | 110 | 101 | 107 |
| Ds(4) | | 350 | 310 | 307 | 435 | 278 | 385 | 352 | 398 |
| VOF$_4$ | | 623 | 602 | 603 | 700 | 572 | 680 | 633 | 698 |
| overall evaluation of flame retardancy | | B | B | B | C | A | C | B | C |

TABLE 4

| component | designation | 18 | 19 | 20 | 21 | 22 | 23 | 24 | 25 | 26 | 27 |
|---|---|---|---|---|---|---|---|---|---|---|---|
| | | | | | examples | | | | | | |
| PC resin (A1) | A1-1 | 100 | 75 | 50 | 100 | 75 | 50 | 100 | 100 | 100 | 100 |
| PC resin (A2) | A2-1 | 0 | 25 | 50 | 0 | 25 | 50 | 0 | 0 | 0 | 0 |
| | A2-2 | 0 | 0 | 0 | 0 | 0 | 0 | 0 | 0 | 0 | 0 |
| | A2-3 | 0 | 0 | 0 | 0 | 0 | 0 | 0 | 0 | 0 | 0 |
| phosphorus flame retardant (B) | B-1 | 13 | 13 | 13 | 13 | 13 | 13 | 13 | 13 | 13 | 13 |
| silicone flame retardant (C) | C-1 | 8 | 8 | 8 | 16 | 16 | 16 | 16 | 16 | 8 | 8 |
| | C-2 | 0 | 0 | 0 | 0 | 0 | 0 | 0 | 0 | 0 | 0 |
| inorganic filler (D) | D-1 | 35 | 35 | 35 | 35 | 35 | 35 | 0 | 20 | 0 | 0 |
| | D-2 | 0 | 0 | 0 | 0 | 0 | 0 | 35 | 15 | 0 | 0 |
| | D-4 | 0 | 0 | 0 | 0 | 0 | 0 | 0 | 0 | 20 | 0 |
| | D-5 | 0 | 0 | 0 | 0 | 0 | 0 | 0 | 0 | 0 | 20 |
| fluoropolymer (E) | E | 0.2 | 0.2 | 0.2 | 0.2 | 0.2 | 0.2 | 0.2 | 0.2 | 0.2 | 0.2 |
| organic acid (F) | F-1 | 0.14 | 0.14 | 0.14 | 0.14 | 0.14 | 0.14 | 0.14 | 0.14 | 0.14 | 0.14 |
| | F-2 | 0 | 0 | 0 | 0 | 0 | 0 | 0 | 0 | 0 | 0 |
| stabilizer (G) | G | 0.07 | 0.07 | 0.07 | 0.07 | 0.07 | 0.07 | 0.07 | 0.07 | 0.07 | 0.07 |
| (A1)/(A2) mass ratio | | 100/0 | 75/25 | 50/50 | 100/0 | 75/25 | 50/50 | 100/0 | 100/0 | 100/0 | 100/0 |
| proportion of banched structure-bearing PC resin (mass %) | | 100 | 100 | 100 | 100 | 100 | 100 | 100 | 100 | 100 | 100 |
| [(B) + (C)]/(D) | | 0.60 | 0.60 | 0.60 | 0.83 | 0.83 | 0.83 | 0.83 | 0.83 | 1.05 | 1.05 |
| maximum average rate of heat emission (kW/m$^2$) | | 85 | 95 | 97 | 87 | 93 | 95 | 93 | 96 | 119 | 117 |
| Ds(4) | | 298 | 305 | 335 | 286 | 309 | 312 | 295 | 306 | 425 | 476 |
| VOF$_4$ | | 575 | 588 | 620 | 583 | 592 | 590 | 593 | 589 | 635 | 680 |
| overall evaluation of flame retardancy | | A | A | B | A | A | A | A | A | C | C |

TABLE 5

| component | designation | 1 | 2 | 3 | 4 | 5 | 6 | 7 |
|---|---|---|---|---|---|---|---|---|
| | | | | comparative examples | | | | |
| PC resin (A1) | A1-1 | 0 | 0 | 0 | 100 | 100 | 100 | 0 |
| PC resin (A2) | A2-1 | 100 | 0 | 0 | 0 | 0 | 0 | 100 |
| | A2-2 | 0 | 100 | 0 | 0 | 0 | 0 | 0 |
| | A2-3 | 0 | 0 | 100 | 0 | 0 | 0 | 0 |
| phosphorus flame retardant (B) | B-1 | 11 | 11 | 11 | 0 | 11 | 11 | 13 |
| silicone flame retardant (C) | C-1 | 7 | 7 | 7 | 7 | 0 | 7 | 0 |
| | C-2 | 0 | 0 | 0 | 0 | 0 | 0 | 0 |
| | C-4 | 0 | 0 | 0 | 0 | 0 | 0 | 8 |
| inorganic filler (D) | D-1 | 20 | 20 | 20 | 20 | 20 | 0 | 33 |
| | D-2 | 0 | 0 | 0 | 0 | 0 | 0 | 0 |
| fluoropolymer (E) | E | 0.2 | 0.2 | 0.2 | 0.2 | 0.2 | 0.2 | 0.2 |
| organic acid (F) | F-1 | 0.14 | 0.14 | 0.14 | 0.14 | 0.14 | 0.14 | 0.14 |
| | F-2 | 0 | 0 | 0 | 0 | 0 | 0 | 0 |
| stabilizer (G) | G | 0.07 | 0.07 | 0.07 | 0.07 | 0.07 | 0.07 | 0.1 |
| (A1)/(A2) mass ratio | | 0/100 | 0/100 | 0/100 | 100/0 | 100/0 | 100/0 | 0/100 |
| proportion of branched structure-bearing PC resin (mass %) | | 100 | 0 | 0 | 100 | 100 | 100 | 100 |
| [(B) + (C)]/(D) | | 0.9 | 0.9 | 0.9 | 0.35 | 0.55 | — | 0.73 |
| maximum average rate of heat emission (kW/m$^2$) | | 123 | 120 | 125 | 178 | 160 | 205 | 155 |
| Ds(4) | | 536 | 530 | 526 | 702 | 680 | 726 | 504 |
| VOF$_4$ | | 725 | 795 | 719 | 1295 | 1198 | 1350 | 1039 |
| overall evaluation of flame retardancy | | D | D | D | E | E | E | E |

TABLE 6

| component | designation | examples | | | | | | |
|---|---|---|---|---|---|---|---|---|
| | | 28 | 29 | 30 | 31 | 32 | 33 | 34 |
| PC resin (A1) | A1-1 | 100 | 75 | 50 | 15 | 50 | 15 | 50 |
| | A1-2 | 0 | 0 | 0 | 0 | 0 | 0 | 0 |
| PC resin (A2) | A2-1 | 0 | 25 | 50 | 0 | 0 | 0 | 0 |
| | A2-2 | 0 | 0 | 0 | 85 | 50 | 0 | 0 |
| | A2-3 | 0 | 0 | 0 | 0 | 0 | 85 | 50 |
| phosphorus flame retardant (B) | B-2 | 0 | 0 | 0 | 0 | 0 | 0 | 0 |
| | B-3 | 13 | 13 | 13 | 13 | 13 | 13 | 13 |
| | B-4 | 0 | 0 | 0 | 0 | 0 | 0 | 0 |
| silicone flame retardant (C) | C-1 | 0 | 0 | 0 | 0 | 0 | 0 | 0 |
| | C-3 | 16 | 16 | 16 | 16 | 16 | 16 | 16 |
| | C-4 | 0 | 0 | 0 | 0 | 0 | 0 | 0 |
| inorganic filler (D) | D-1 | 35 | 35 | 35 | 35 | 35 | 35 | 35 |
| | D-2 | 0 | 0 | 0 | 0 | 0 | 0 | 0 |
| | D-3 | 0 | 0 | 0 | 0 | 0 | 0 | 0 |
| fluoropolymer (E) | E | 0.2 | 0.2 | 0.2 | 0.2 | 0.2 | 0.2 | 0.2 |
| organic acid (F) | F-1 | 0.14 | 0.14 | 0.14 | 0.14 | 0.14 | 0.14 | 0.14 |
| | F-2 | 0 | 0 | 0 | 0 | 0 | 0 | 0 |
| stabilizer (G) | G | 0.07 | 0.07 | 0.07 | 0.07 | 0.07 | 0.07 | 0.07 |
| (A1)/(A2) mass ratio | | 100/0 | 75/25 | 50/50 | 15/85 | 50/50 | 15/85 | 50/50 |
| proportion of branched structure-bearing PC resin (mass %) | | 100 | 100 | 100 | 15 | 50 | 15 | 50 |
| [(B) + (C)]/(D) | | 0.83 | 0.83 | 0.83 | 0.83 | 0.83 | 0.83 | 0.83 |
| maximum average rate of heat emission (kW/m$^2$) | | 85 | 90 | 94 | 115 | 105 | 118 | 110 |
| Ds(4) | | 276 | 272 | 292 | 412 | 350 | 390 | 345 |
| VOF$_4$ | | 395 | 366 | 412 | 680 | 607 | 640 | 673 |
| overall evaluation of flame retardancy | | A | A | A | C | B | C | B |

TABLE 7

| component | designation | examples | | | | | | | | | | | |
|---|---|---|---|---|---|---|---|---|---|---|---|---|---|
| | | 35 | 36 | 37 | 38 | 39 | 40 | 41 | 42 | 43 | 44 | 45 | 46 |
| PC resin (A1) | A1-1 | 100 | 100 | 100 | 50 | 50 | 30 | 30 | 50 | 50 | 30 | 30 | 0 |
| | A1-2 | 0 | 0 | 0 | 0 | 0 | 0 | 0 | 0 | 0 | 0 | 0 | 100 |
| PC resin (A2) | A2-1 | 0 | 0 | 0 | 50 | 0 | 70 | 70 | 50 | 50 | 70 | 70 | 0 |
| | A2-2 | 0 | 0 | 0 | 0 | 0 | 0 | 0 | 0 | 0 | 0 | 0 | 0 |
| | A2-3 | 0 | 0 | 0 | 0 | 50 | 0 | 0 | 0 | 0 | 0 | 0 | 0 |
| phosphorus flame retardant (B) | B-2 | 0 | 0 | 0 | 0 | 0 | 0 | 0 | 0 | 0 | 0 | 0 | 0 |
| | B-3 | 0 | 0 | 0 | 0 | 0 | 0 | 0 | 0 | 0 | 0 | 0 | 13 |
| | B-4 | 6 | 13 | 13 | 13 | 13 | 13 | 13 | 13 | 13 | 13 | 13 | 0 |
| silicone flame retardant (C) | C-1 | 0 | 0 | 0 | 0 | 0 | 0 | 0 | 0 | 0 | 0 | 0 | 0 |
| | C-3 | 0 | 0 | 0 | 0 | 0 | 0 | 0 | 0 | 0 | 0 | 0 | 0 |
| | C-4 | 15 | 16 | 16 | 16 | 16 | 16 | 16 | 16 | 16 | 16 | 16 | 16 |
| inorganic filler (D) | D-1 | 32 | 34 | 28 | 34 | 34 | 34 | 0 | 24 | 0 | 17 | 0 | 34 |
| | D-2 | 0 | 0 | 0 | 0 | 0 | 0 | 0 | 10 | 10 | 8 | 8 | 0 |
| | D-3 | 0 | 0 | 0 | 0 | 0 | 0 | 34 | 0 | 24 | 0 | 17 | 0 |
| fluoropolymer (E) | E | 0.2 | 0.2 | 0.2 | 0.2 | 0.2 | 0.2 | 0.2 | 0.2 | 0.2 | 0.2 | 0.2 | 0.2 |
| organic acid (F) | F-1 | 0.14 | 0.14 | 0.14 | 0.14 | 0.14 | 0.14 | 0.14 | 0.14 | 0.14 | 0.14 | 0.14 | 0.14 |
| | F-2 | 0 | 0 | 0 | 0 | 0 | 0 | 0 | 0 | 0 | 0 | 0 | 0 |
| stabilizer (G) | G | 0.1 | 0.1 | 0.1 | 0.1 | 0.1 | 0.1 | 0.1 | 0.1 | 0.1 | 0.1 | 0.1 | 0.1 |
| (A1)/(A2) mass ratio | | 100/0 | 100/0 | 100/0 | 50/50 | 50/50 | 30/70 | 30/70 | 50/50 | 50/50 | 30/70 | 30/70 | 100/0 |
| proportion of branched structure-bearing PC resin (mass %) | | 100 | 100 | 100 | 100 | 50 | 100 | 100 | 50 | 50 | 100 | 100 | 0 |
| [(B) + (C)]/(D) | | 0.67 | 0.86 | 1.00 | 0.86 | 0.85 | 0.85 | 0.85 | 0.85 | 0.85 | 1.16 | 1.16 | 0.85 |
| maximum average rate of heat emission (kW/m$^2$) | | 86 | 75 | 78 | 79 | 95 | 96 | 92 | 97 | 91 | 100 | 94 | 119 |
| Ds(4) | | 289 | 265 | 252 | 205 | 285 | 205 | 163 | 263 | 251 | 239 | 201 | 375 |
| VOF$_4$ | | 562 | 480 | 407 | 363 | 523 | 387 | 332 | 403 | 362 | 450 | 400 | 625 |
| overall evaluation of flame retardancy | | A | A | A | A | A | A | A | A | A | A | A | C |

TABLE 8

| component | designation | examples 47 | 48 | 49 | 50 | 51 | 52 | 53 | 54 |
|---|---|---|---|---|---|---|---|---|---|
| PC resin (A1) | A1-1 | 100 | 100 | 100 | 100 | 100 | 100 | 100 | 100 |
| PC resin (A2) | A2-1 | 0 | 0 | 0 | 0 | 0 | 0 | 0 | 0 |
|  | A2-2 | 0 | 0 | 0 | 0 | 0 | 0 | 0 | 0 |
|  | A2-3 | 0 | 0 | 0 | 0 | 0 | 0 | 0 | 0 |
| phosphorus flame retardant (B) | B-2 | 5 | 13 | 18 | 0 | 0 | 0 | 0 | 0 |
|  | B-3 | 0 | 0 | 0 | 5 | 18 | 0 | 0 | 0 |
|  | B-4 | 0 | 0 | 0 | 0 | 0 | 5 | 13 | 18 |
| silicone flame retardant (C) | C-1 | 0 | 0 | 0 | 0 | 0 | 0 | 0 | 0 |
|  | C-3 | 16 | 16 | 16 | 16 | 16 | 16 | 16 | 16 |
|  | C-4 | 0 | 0 | 0 | 0 | 0 | 0 | 0 | 0 |
| inorganic filler (D) | D-1 | 35 | 35 | 35 | 35 | 35 | 35 | 35 | 35 |
|  | D-2 | 0 | 0 | 0 | 0 | 0 | 0 | 0 | 0 |
| fluoropolymer (E) | E | 0.2 | 0.2 | 0.2 | 0.2 | 0.2 | 0.2 | 0.2 | 0.2 |
| organic acid (F) | F-1 | 0.14 | 0.14 | 0.14 | 0.14 | 0.14 | 0.14 | 0.14 | 0.14 |
|  | F-2 | 0 | 0 | 0 | 0 | 0 | 0 | 0 | 0 |
| stabilizer (G) | G | 0.07 | 0.07 | 0.07 | 0.07 | 0.07 | 0.07 | 0.07 | 0.07 |
| (A1)/(A2) mass ratio |  | 100/0 | 100/0 | 100/0 | 100/0 | 100/0 | 100/0 | 100/0 | 100/0 |
| proportion of branched structure-bearing PC resin (mass %) |  | 100 | 100 | 100 | 100 | 100 | 100 | 100 | 100 |
| [(B) + (C)]/(D) |  | 0.60 | 0.83 | 0.97 | 0.60 | 0.97 | 0.60 | 0.83 | 0.97 |
| maximum average rate of heat emission (kW/m$^2$) |  | 112 | 95 | 110 | 87 | 88 | 86 | 75 | 87 |
| Ds(4) |  | 329 | 299 | 318 | 305 | 280 | 289 | 265 | 279 |
| VOF$_4$ |  | 675 | 580 | 608 | 587 | 498 | 562 | 480 | 512 |
| overall evaluation of flame retardancy |  | C | A | C | A | A | A | A | A |

TABLE 9

| component | designation | examples 55 | 56 | 57 | 58 | 59 | 60 | 61 | 62 |
|---|---|---|---|---|---|---|---|---|---|
| PC resin (A1) | A1-1 | 100 | 100 | 100 | 100 | 100 | 100 | 100 | 100 |
| PC resin (A2) | A2-1 | 0 | 0 | 0 | 0 | 0 | 0 | 0 | 0 |
|  | A2-2 | 0 | 0 | 0 | 0 | 0 | 0 | 0 | 0 |
|  | A2-3 | 0 | 0 | 0 | 0 | 0 | 0 | 0 | 0 |
| phosphorus flame retardant (B) | B-2 | 0 | 0 | 0 | 0 | 0 | 0 | 0 | 0 |
|  | B-3 | 13 | 13 | 13 | 13 | 13 | 13 | 13 | 13 |
|  | B-4 | 0 | 0 | 0 | 0 | 0 | 0 | 0 | 0 |
| silicone flame retardant (C) | C-1 | 3 | 8 | 16 | 0 | 0 | 0 | 0 | 0 |
|  | C-3 | 13 | 13 | 13 | 3 | 8 | 13 | 13 | 13 |
|  | C-4 | 13 | 13 | 13 | 0 | 0 | 3 | 8 | 16 |
| inorganic filler (D) | D-1 | 35 | 35 | 35 | 35 | 35 | 35 | 35 | 35 |
|  | D-2 | 0 | 0 | 0 | 0 | 0 | 0 | 0 | 0 |
| fluoropolymer (E) | E | 0.2 | 0.2 | 0.2 | 0.2 | 0.2 | 0.2 | 0.2 | 0.2 |
| organic acid (F) | F-1 | 0.14 | 0.14 | 0.14 | 0.14 | 0.14 | 0.14 | 0.14 | 0.14 |
|  | F-2 | 0 | 0 | 0 | 0 | 0 | 0 | 0 | 0 |
| stabilizer (G) | G | 0.07 | 0.07 | 0.07 | 0.07 | 0.07 | 0.07 | 0.07 | 0.07 |
| (A1)/(A2) mass ratio |  | 100/0 | 100/0 | 100/0 | 100/0 | 100/0 | 100/0 | 100/0 | 100/0 |
| proportion of branched structure-bearing PC resin (mass %) |  | 100 | 100 | 100 | 100 | 100 | 100 | 100 | 100 |
| [(B) + (C)]/(D) |  | 1.20 | 1.34 | 1.57 | 0.46 | 0.60 | 0.83 | 0.97 | 1.20 |
| maximum average rate of heat emission (kW/m$^2$) |  | 112 | 95 | 92 | 111 | 88 | 108 | 85 | 78 |
| Ds(4) |  | 380 | 287 | 277 | 345 | 285 | 308 | 298 | 253 |
| VOF$_4$ |  | 703 | 550 | 587 | 653 | 467 | 478 | 347 | 345 |
| overall evaluation of flame retardancy |  | C | A | A | C | A | A | A | A |

TABLE 10

| component | designation | 63 | 64 | 65 | 66 | 67 | 68 |
|---|---|---|---|---|---|---|---|
| PC resin (A1) | A1-1 | 100 | 100 | 100 | 100 | 100 | 100 |
| PC resin (A2) | A2-1 | 0 | 0 | 0 | 0 | 0 | 0 |
|  | A2-2 | 0 | 0 | 0 | 0 | 0 | 0 |
|  | A2-3 | 0 | 0 | 0 | 0 | 0 | 0 |
| phosphorus flame retardant (B) | B-2 | 0 | 0 | 0 | 0 | 0 | 0 |
|  | B-3 | 13 | 13 | 13 | 13 | 13 | 13 |
|  | B-4 | 0 | 0 | 0 | 0 | 0 | 0 |
| silicone flame retardant (C) | C-1 | 0 | 0 | 0 | 0 | 0 | 0 |
|  | C-3 | 16 | 16 | 16 | 16 | 16 | 16 |
|  | C-4 | 0 | 0 | 0 | 0 | 0 | 0 |
| inorganic filler (D) | D-1 | 10 | 20 | 45 | 0 | 0 | 20 |
|  | D-2 | 0 | 0 | 0 | 20 | 35 | 15 |
| fluororesin (E) | E | 0.2 | 0.2 | 0.2 | 0.2 | 0.2 | 0.2 |
| organic acid (F) | F-1 | 0.14 | 0.14 | 0.14 | 0.14 | 0.14 | 0.14 |
|  | F-2 | 0 | 0 | 0 | 0 | 0 | 0 |
| stabilizer (G) | G | 0.07 | 0.07 | 0.07 | 0.07 | 0.07 | 0.07 |
| (A1)/(A2) mass ratio |  | 100/0 | 100/0 | 100/0 | 100/0 | 100/0 | 100/0 |
| [(B) + (C)]/(D) |  | 2.90 | 1.45 | 0.64 | 1.45 | 0.83 | 0.83 |
| maximum average rate of heat emission (kW/m$^2$) |  | 121 | 100 | 98 | 92 | 86 | 88 |
| Ds(4) |  | 367 | 321 | 316 | 298 | 267 | 275 |
| VOF$_4$ |  | 780 | 615 | 600 | 550 | 523 | 498 |
| overall evaluation of flame retardancy |  | C | B | A | A | A | A |

The results shown in Tables 2 to 10 demonstrate that an excellent low heat release performance and an excellent low smoke generation performance can be achieved for the first time by a polycarbonate resin composition that satisfies all of the conditions prescribed for the first invention.

Examples of Second Invention

The second invention is specifically described in the following using examples in accordance with the second invention. However, the second invention should not be construed as being limited to or by the following examples. Besides the components already described above, the components newly used in the examples and comparative examples are as given in the following Table 11.

TABLE 11

| component | designation |  |
|---|---|---|
| other resin | PPE | modified polyphenylene ether resin product name: Iupiace PX-100L, Mitsubishi Engineering-Plastics Corporation |
|  | PAR | polyarylate resin product name: U-Polymer, POWDER RX, Unitika Ltd. |
|  | PEI | polyetherimide resin product name: ULTEM1000, SABIC Innovative Plastics |

Examples 69 to 79

The components indicated above were blended and mixed in the proportions (mass parts in all instances) given in Table 11 below and kneaded at a barrel temperature of 280° C. using a twin-screw extruder ("TEX30 XCT", The Japan Steel Works, Ltd.) to produce polycarbonate resin composition pellets. The obtained pellets were dried for 5 hours at 80° C., followed by test specimen fabrication according to the same procedure as described above and execution of the same evaluations.

TABLE 12

| component | designation | examples | | | | | | | | | | | comparative example |
|---|---|---|---|---|---|---|---|---|---|---|---|---|---|
|  |  | 69 | 70 | 71 | 72 | 73 | 74 | 75 | 76 | 77 | 78 | 79 | 7 |
| PC resin (A1) | A1-1 | 0 | 0 | 2 | 5 | 0 | 0 | 0 | 0 | 0 | 0 | 0 | 0 |
| PC resin (A2) | A2-1 | 100 | 100 | 98 | 95 | 100 | 100 | 100 | 100 | 0 | 100 | 100 | 100 |
|  | A2-2 | 0 | 0 | 0 | 0 | 0 | 0 | 0 | 0 | 0 | 0 | 0 | 0 |
|  | A2-3 | 0 | 0 | 0 | 0 | 0 | 0 | 0 | 0 | 100 | 0 | 0 | 0 |
| additional resin other than PC resin | PPE | 0 | 0 | 0 | 0 | 0 | 11 | 0 | 0 | 0 | 0 | 10 | 0 |
|  | PAR | 0 | 0 | 0 | 0 | 0 | 0 | 11 | 0 | 0 | 0 | 0 | 0 |
|  | PEI | 0 | 0 | 0 | 0 | 0 | 0 | 0 | 11 | 0 | 0 | 0 | 0 |

TABLE 12-continued

| component | designation | examples 69 | 70 | 71 | 72 | 73 | 74 | 75 | 76 | 77 | 78 | 79 | comparative example 7 |
|---|---|---|---|---|---|---|---|---|---|---|---|---|---|
| phosphorus flame retardant (B) | B-1 | 0 | 0 | 0 | 0 | 0 | 0 | 0 | 0 | 0 | 0 | 0 | 13 |
| | B-3 | 0 | 0 | 0 | 0 | 0 | 0 | 0 | 0 | 0 | 13 | 13 | 0 |
| | B-4 | 6 | 13 | 13 | 13 | 13 | 15 | 15 | 15 | 13 | 0 | 0 | 0 |
| silicone flame retardant (C) | C-4 | 15 | 16 | 16 | 16 | 16 | 9 | 9 | 9 | 16 | 16 | 8 | 8 |
| inorganic filler (D) | D-1 | 32 | 34 | 34 | 34 | 28 | 38 | 38 | 38 | 34 | 34 | 35 | 33 |
| fluoropolymer (E) | E | 0.2 | 0.2 | 0.2 | 0.2 | 0.2 | 0.2 | 0.2 | 0.2 | 0.2 | 0.2 | 0.2 | 0.2 |
| stabilizer (G) | G | 0.1 | 0.1 | 0.1 | 0.1 | 0.1 | 0.1 | 0.1 | 0.1 | 0.1 | 0.1 | 0.1 | 0.1 |
| (A1)/(A2) mass ratio | | 0/100 | 0/100 | 2/98 | 5/95 | 0/100 | 0/100 | 0/100 | 0/100 | 0/100 | 0/100 | 0/100 | 0/100 |
| proportion of branched structure-bearing PC resin (mass %) | | 100 | 100 | 100 | 100 | 100 | 100 | 100 | 100 | 0 | 100 | 100 | 100 |
| [(B) + (C)]/(D) | | 0.66 | 0.85 | 0.85 | 0.85 | 1.04 | 0.63 | 0.63 | 0.63 | 0.85 | 0.85 | 0.60 | 0.73 |
| maximum average rate of heat emission (kW/m²) | | 130 | 117 | 112 | 108 | 122 | 149 | 137 | 125 | 121 | 146 | 150 | 155 |
| Ds(4) | | 289 | 228 | 287 | 312 | 325 | 407 | 423 | 387 | 504 | 435 | 424 | 504 |
| VOF₄ | | 607 | 449 | 598 | 623 | 700 | 789 | 835 | 702 | 988 | 943 | 889 | 1039 |
| overall evaluation of flame retardancy | | D | B | B | B | D | D | D | D | D | D | D | E |

The results shown in Table 12 demonstrate that an excellent low heat release performance and an excellent low smoke generation performance can be achieved by a polycarbonate resin composition that satisfies all of the conditions prescribed for the second invention.

INDUSTRIAL APPLICABILITY

The polycarbonate resin composition according to the present invention exhibits an excellent performance with regard to low heat release and low smoke generation and because of this can be used as a molded article in various applications and in particular is advantageous for interior members for railway vehicles and thus has a very high industrial applicability.

The invention claimed is:
1. A polycarbonate resin composition, comprising:
100 mass parts of a polycarbonate resin comprising a polycarbonate resin (A1) having a structural unit of formula (1) and a polycarbonate resin (A2) having a structural unit of formula (2) in a mass ratio (A1)/(A2) of (less than 10)/(more than 90) to 0/100;
13 to 40 mass parts of a phosphorus flame retardant (B);
2 to 40 mass parts of a silicone flame retardant (C), which is a polyorganosiloxane-containing graft copolymer; and
30 to 100 mass parts of talc (D),
wherein the phosphorus flame retardant (B) is a condensed phosphate ester compound of formula (3)

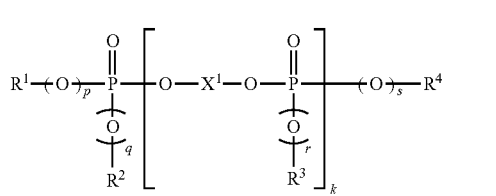

where: $R^1$, $R^2$, $R^3$, and $R^4$ each represent an alkyl group having 1 to 6 carbons or an aryl group having 6 to 20 carbons which are optionally substituted by an alkyl group; p, q, r, and s are each 0 or 1; k is an integer from 1 to 5; and $X^1$ represents an arylene group,
the phosphorus flame retardant (B) does not contain a phosphazene compound or contains a phosphazene compound in a content of less than 3 mass parts,
a total content of the phosphorus flame retardant (B) and the silicone flame retardant (C) is 24 to 40 mass parts per 100 mass parts of a total of the polycarbonate resins (A1) and (A2), and
a ratio [(B)+(C)]/(D) between the total content of the phosphorus flame retardant (B) and the silicone flame retardant (C) and the content of the talc (D) is not more than 1.04,

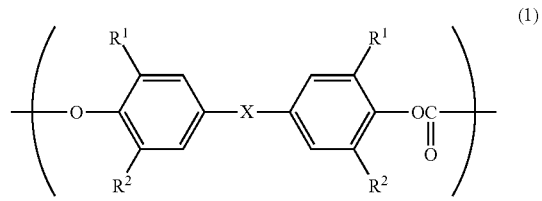

wherein in formula (1), $R^1$ represents a methyl group; $R^2$ represents a hydrogen atom or a methyl group; X represents $$-\underset{R^4}{\overset{R^3}{\underset{|}{\overset{|}{C}}}}-, \quad -(\underset{Z}{C})-$$

wherein, $R^3$ and $R^4$ represent a hydrogen atom or a methyl group; and Z represents a group that binds to the carbon atom C to form an optionally substituted alicyclic hydrocarbon having 6 to 12 carbons,

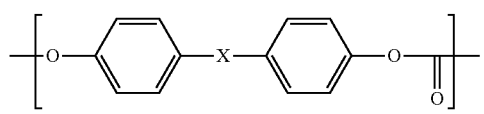
(2)

wherein in formula (2), X is as defined for formula (1).

2. The polycarbonate resin composition according to claim 1, wherein, in formula (1), $R^1$ is a methyl group and $R^2$ is a hydrogen atom, and in formulas (1) and (2), X is an isopropylidene group.

3. The polycarbonate resin composition according to claim 1, wherein a content of the polycarbonate resin having a branched structure is 10 to 100 mass % in 100 mass % of the total of polycarbonate resins (A1) and (A2).

4. The polycarbonate resin composition according to claim 1, further comprising, a fluoropolymer (E) at 0.05 to 3 mass parts per 100 mass parts of the total of the polycarbonate resins (A1) and (A2).

5. The polycarbonate resin composition according to claim 1, wherein a maximum average rate of heat emission as tested in accordance with ISO 5660-1 using conditions of a heater irradiance of 50 kW/m² and the presence of ignition is not more than 120 kW/m².

6. The polycarbonate resin composition according to claim 1, wherein a specific optical density $D_s(4)$ at 4 minutes after the beginning of the test as tested in accordance with ISO 5659-2 using conditions of a heater irradiance of 50 kW/m² and a flameless procedure is not more than 400.

7. The polycarbonate resin composition according to claim 1, wherein a cumulative value $VOF_4$ of the specific optical density for 4 minutes after the beginning of the test as tested in accordance with ISO 5659-2 using conditions of a heater irradiance of 50 kW/m² and a flameless procedure is not more than 650.

8. The polycarbonate resin composition according to claim 1, wherein
a maximum average rate of heat emission as tested in accordance with ISO 5660-1 using conditions of a heater irradiance of 50 kW/m² and the presence of ignition is not more than 110 kW/m²,
a $D_s(4)$ at 4 minutes after the beginning of the test as tested in accordance with ISO 5659-2 using conditions of a heater irradiance of 50 kW/m² and a flameless procedure is not more than 350, and
a $VOF_4$ of the specific optical density for 4 minutes after the beginning of the test as tested in accordance with ISO 5659-2 using conditions of a heater irradiance of 50 kW/m² and a flameless procedure is not more than 600.

9. A railway vehicle interior member comprising the polycarbonate resin composition according to claim 1.

10. The polycarbonate resin composition according to claim 1, wherein the minimum value of the ratio of [(B)+(C)]/(D) is 0.3.

11. The polycarbonate resin composition according to claim 1, wherein the minimum value of the ratio of [(B)+(C)]/(D) is 0.6.

12. The polycarbonate resin composition according to claim 1, wherein the phosphorus flame retardant (B) is at least one selected from the group consisting of resorcinol bis(diphenyl phosphate), resorcinol bis(dixylenyl phosphate), bisphenol A bis(diphenyl phosphate), biphenyl bis(diphenyl phosphate), and tetraphenyl-p-phenylene diphosphate.

13. The polycarbonate resin composition according to claim 1, wherein the ratio [(B)+(C)]/(D) is not less than 0.63 and not more than 1.04.

* * * * *